United States Patent
Yu et al.

(10) Patent No.: US 11,675,219 B1
(45) Date of Patent: Jun. 13, 2023

(54) MULTIFUNCTIONAL RESONANT AND LEAKY-WAVE METASURFACES BASED ON SYMMETRY-BREAKING PERTURBATIONS

(71) Applicant: THE TRUSTEES OF COLUMBIA UNIVERSITY IN THE CITY OF NEW YORK, New York, NY (US)

(72) Inventors: Nanfang Yu, Fort Lee, NJ (US); Adam Overvig, Bronx, NY (US); Stephanie Malek, New York, NY (US)

(73) Assignee: THE TRUSTEES OF COLUMBIA UNIVERSITY IN THE CITY OF NEW YORK, New York, NY (US)

( * ) Notice: Subject to any disclaimer, the term of this patent is extended or adjusted under 35 U.S.C. 154(b) by 306 days.

(21) Appl. No.: 17/110,846

(22) Filed: Dec. 3, 2020

Related U.S. Application Data

(60) Provisional application No. 62/944,722, filed on Dec. 6, 2019.

(51) Int. Cl.
 *G02F 1/01* (2006.01)
 *G02B 1/00* (2006.01)
 *G02F 1/00* (2006.01)

(52) U.S. Cl.
 CPC .......... *G02F 1/0121* (2013.01); *G02B 1/005* (2013.01); *G02F 1/0054* (2013.01); *G02F 2202/32* (2013.01); *G02F 2203/15* (2013.01)

(58) Field of Classification Search
 CPC .. G02F 1/0121; G02F 1/0054; G02F 2202/32; G02F 2203/15; G02B 1/005
 See application file for complete search history.

(56) References Cited

U.S. PATENT DOCUMENTS

| | | | |
|---|---|---|---|
| 9,507,064 B2 | 11/2016 | Brongersma et al. | |
| 9,995,859 B2* | 6/2018 | Kamali | G02B 27/4211 |
| 2014/0085693 A1 | 3/2014 | Mosallaei et al. | |
| 2017/0030773 A1 | 2/2017 | Han et al. | |
| 2019/0064532 A1* | 2/2019 | Riley, Jr. | G02B 27/0916 |
| 2019/0086683 A1 | 3/2019 | Aieta et al. | |

OTHER PUBLICATIONS

Wei "Simultaneous Spectral and Spatial Modulation for Color Printing and Holography Using All-Dielectric Metasurfaces, Nov. 6, 2019, Nano Letters p. 8964-8971" (Year: 2019).*
Abujetas "Brewster quasi bound states in the continuum in all-dielectric metasurfaces from single magnetic-dipole resonance meta-atoms, 2019, Hal Open Science". (Year: 2019).*
Huang et al., "Out-of-plane computer-generated multicolor waveguide holography," Optica, vol. 6 / Issue 2, pp. 119-124, 2019.

(Continued)

*Primary Examiner* — Christopher Stanford
*Assistant Examiner* — Journey F Sumlar
(74) *Attorney, Agent, or Firm* — Baker Botts L.L.P.

(57) ABSTRACT

The disclosed subject matter provides systems and methods for spatial and spectral modulation of light. An example system for modulating light can include a substrate and a plurality of meta units, coupled to the substrate and configured to spatially and spectrally modulate the light, wherein the plurality of meta units includes a perturbation and forms a perturbed lattice supporting a quasi-bound state in the continuum.

19 Claims, 25 Drawing Sheets
(24 of 25 Drawing Sheet(s) Filed in Color)

(56) References Cited

OTHER PUBLICATIONS

Sell et al., "Visible Light Metasurfaces Based on Single-Crystal Silicon," ACS Photonics, vol. 16 / Issue 3, pp. 1919-1925, 2016.
Zhang et al., "Colloidal Moderate-Refractive-Index Cu2O Nanospheres as Visible-Region Nanoantennas with Electromagnetic Resonance and Directional Light-Scattering Properties" Advanced Materials, vol. 27 / Issue 45 pp. 7432-7439, 2015.
Zhou et al., "Efficient Silicon Metasurfaces for Visible Light," ACS Photonics, vol. 4 / Issue 3, pp. 544-551, 2017.

* cited by examiner

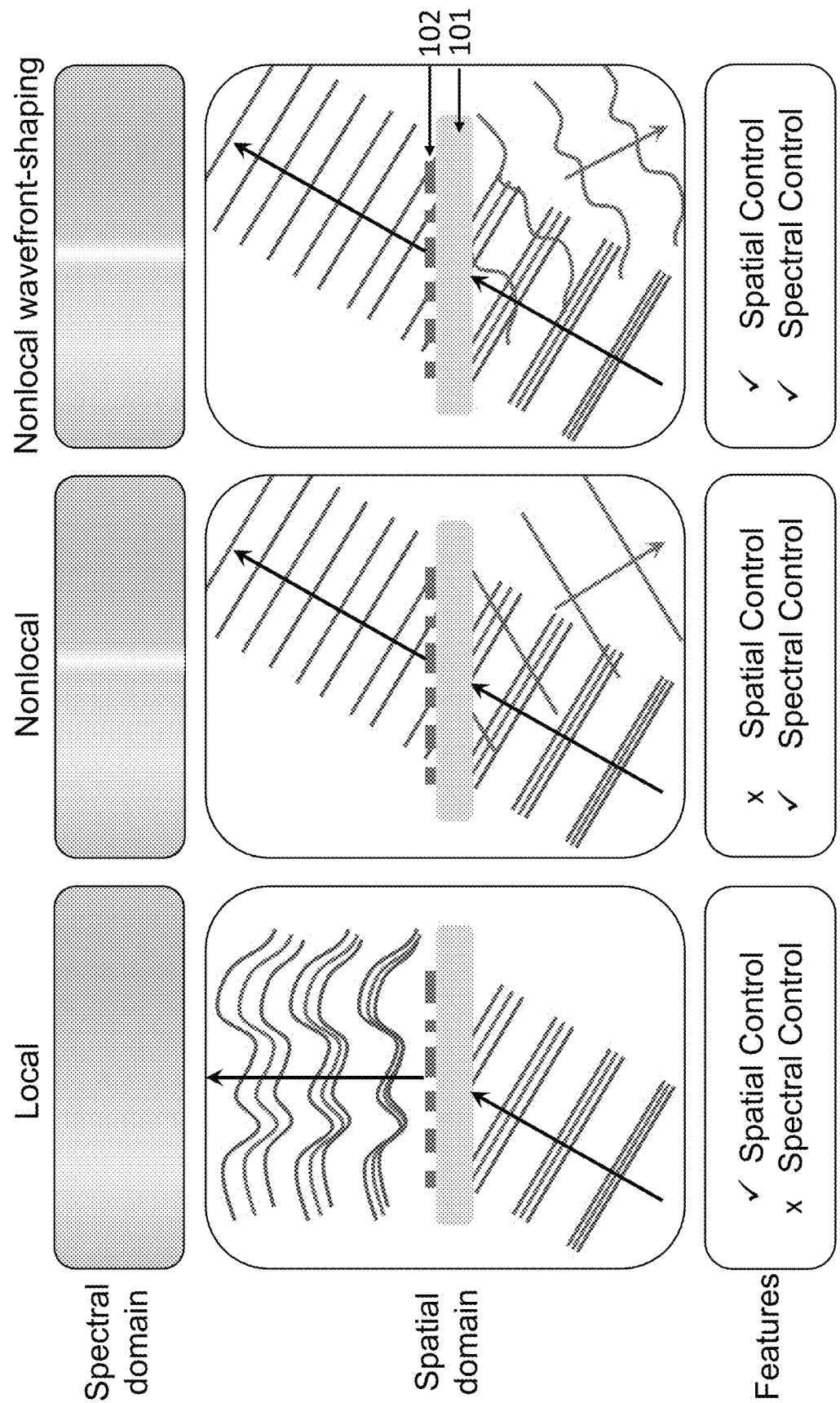

Square lattice

Hexagonal lattice

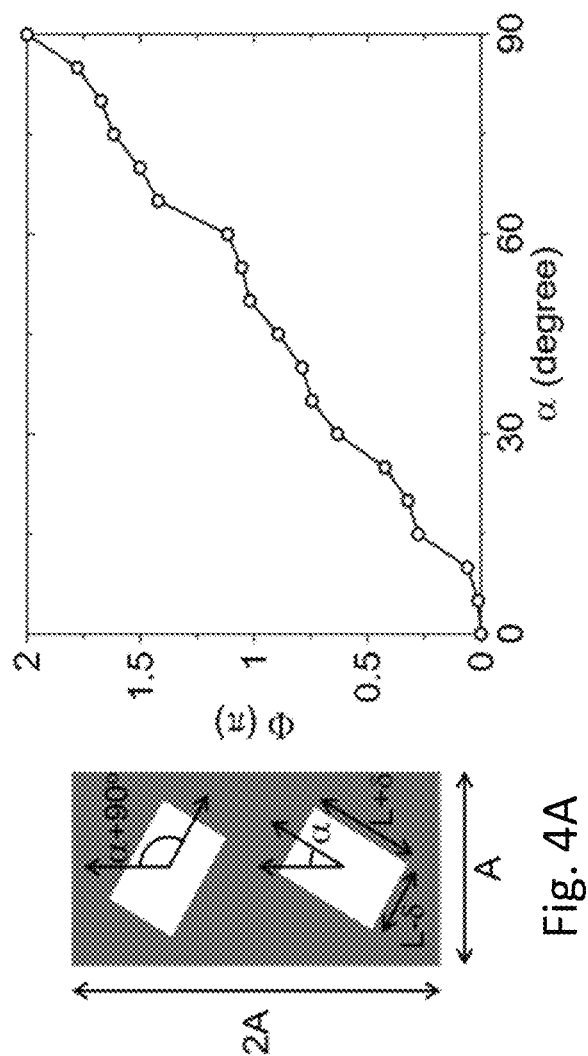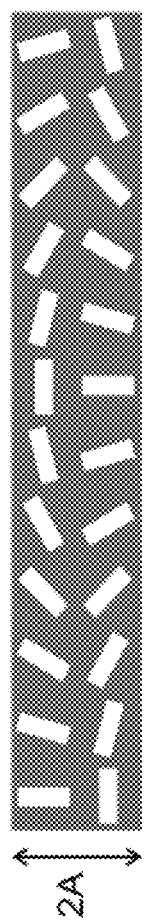
Fig. 4A  Fig. 4B  Fig. 4C

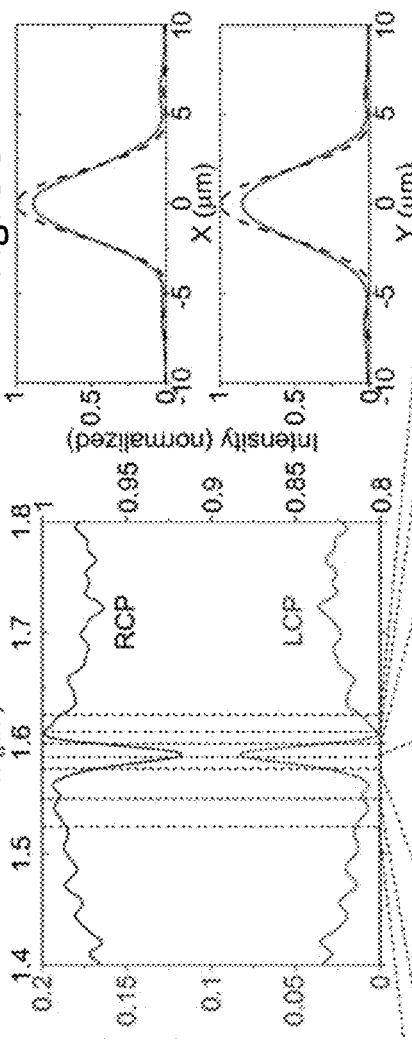
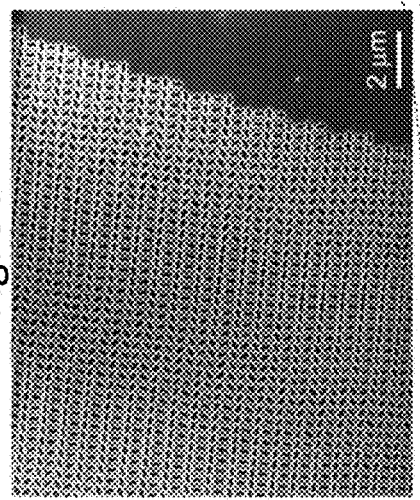
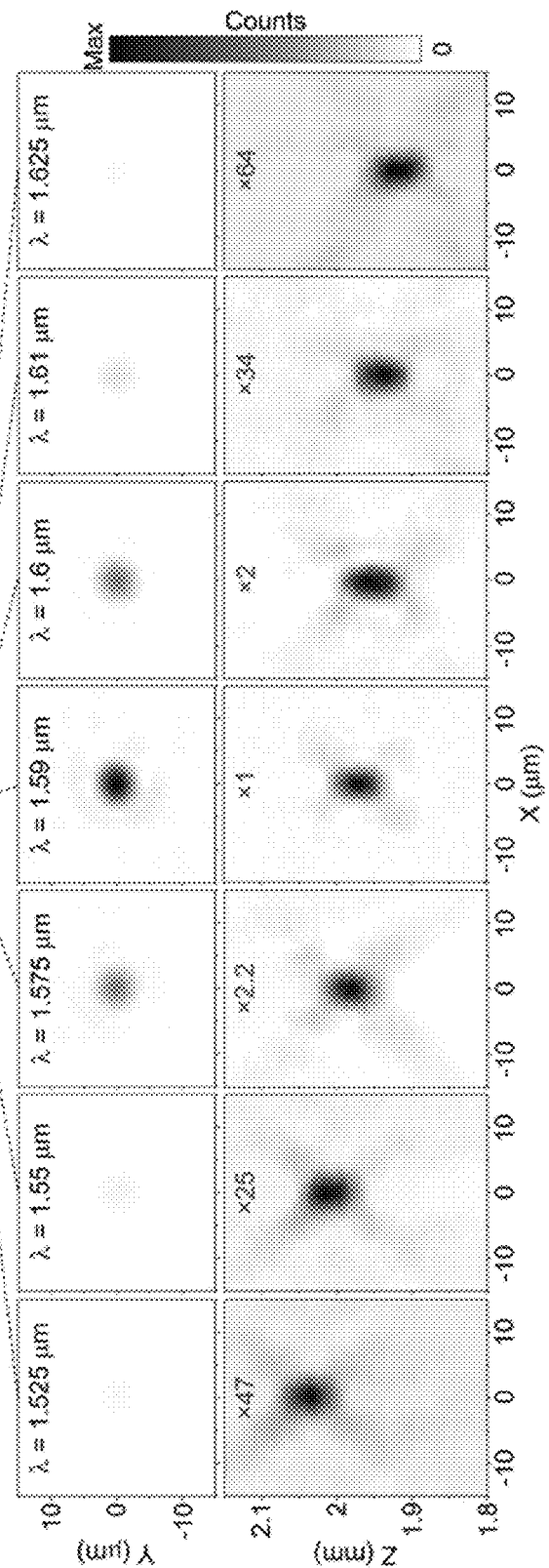

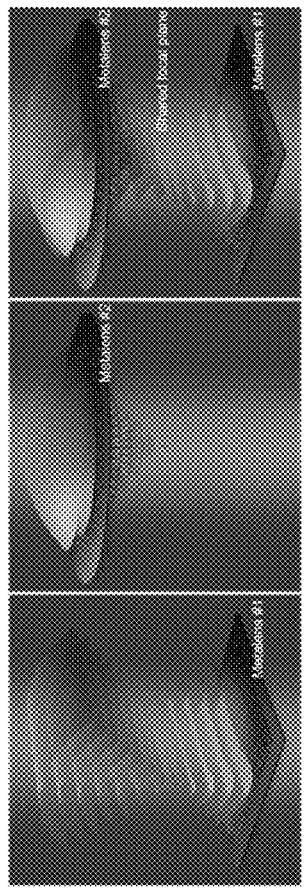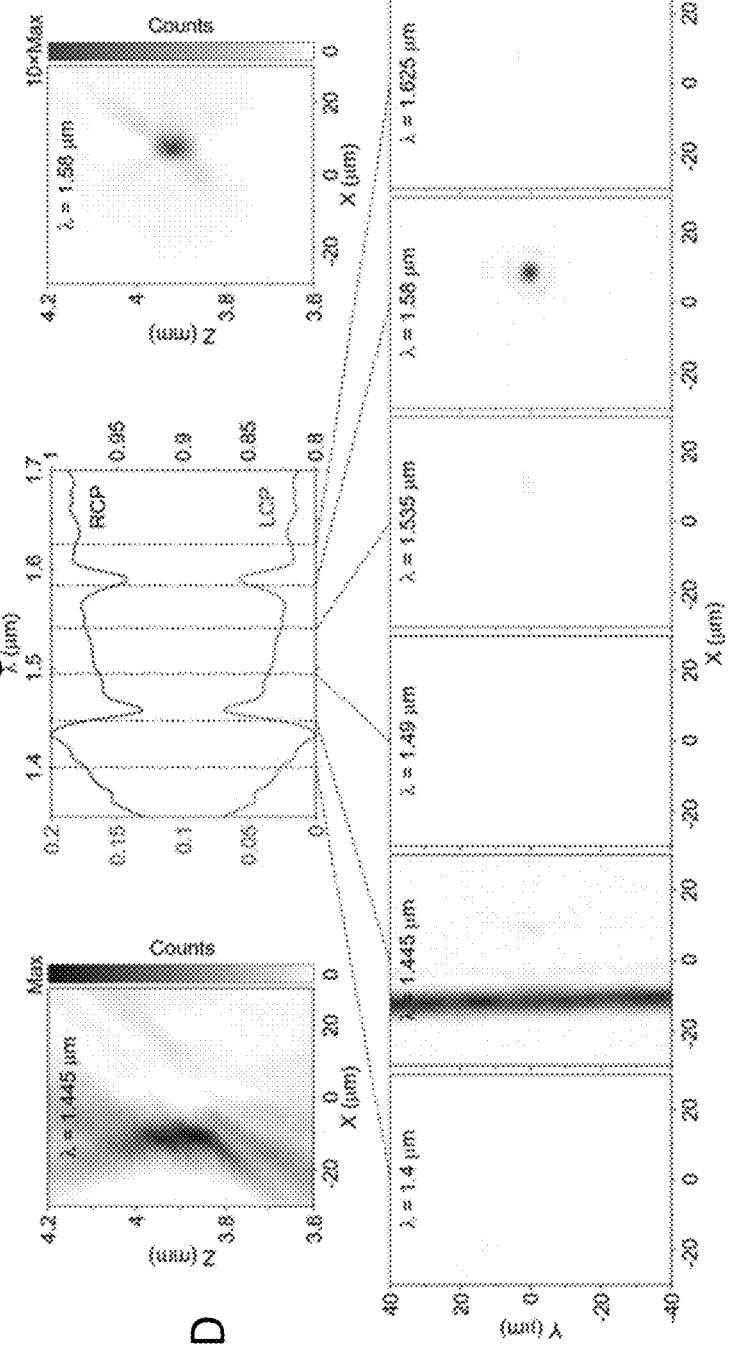
Fig. 6A
Fig. 6B
Fig. 6C
Fig. 6D
Fig. 6E

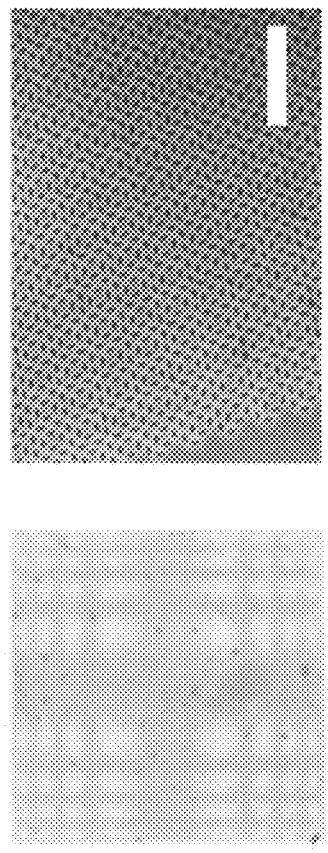
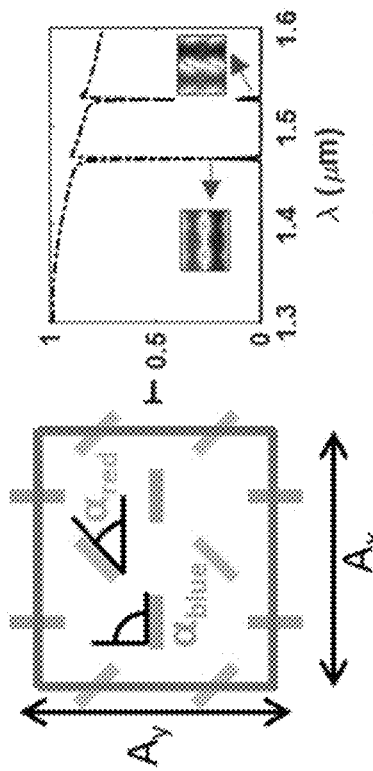
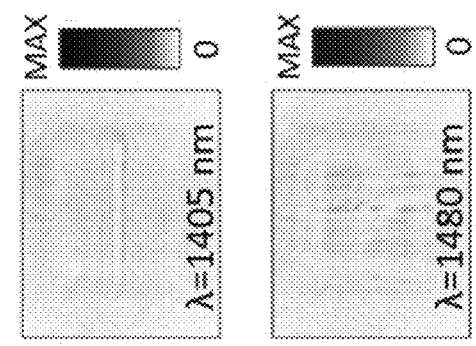
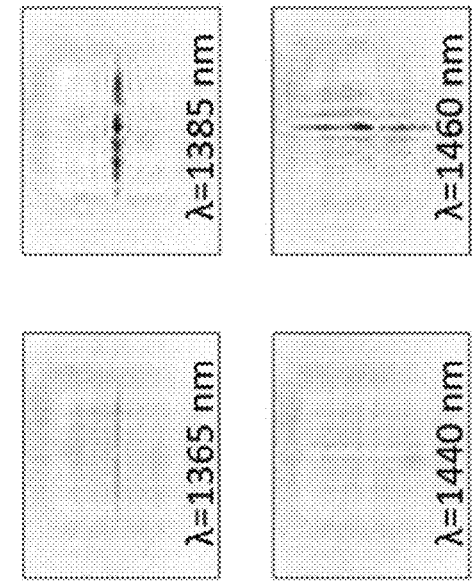
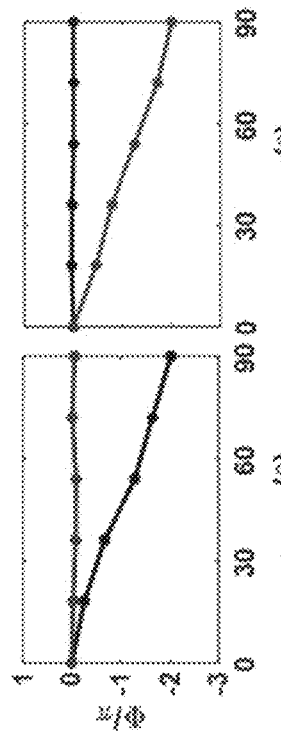
Fig. 8A  Fig. 8B  Fig. 8C  Fig. 8D  Fig. 8E  Fig. 8F

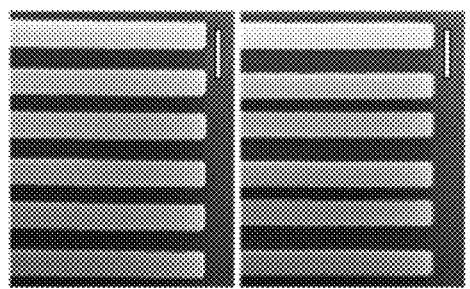
Fig. 11B
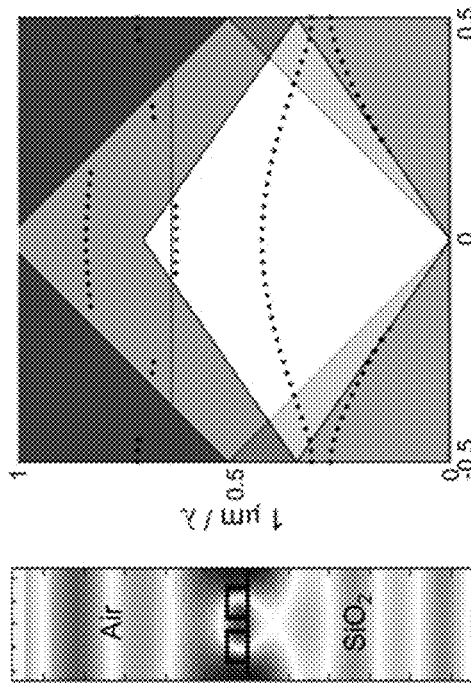
Fig. 11C
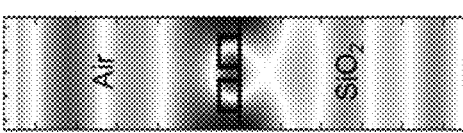
Fig. 11A
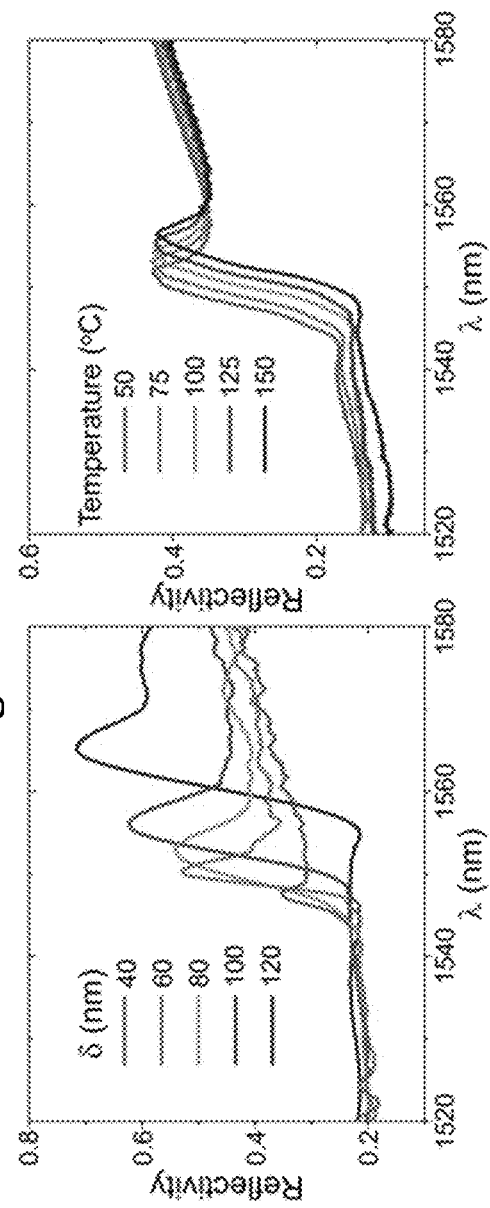
Fig. 11E
Fig. 11D

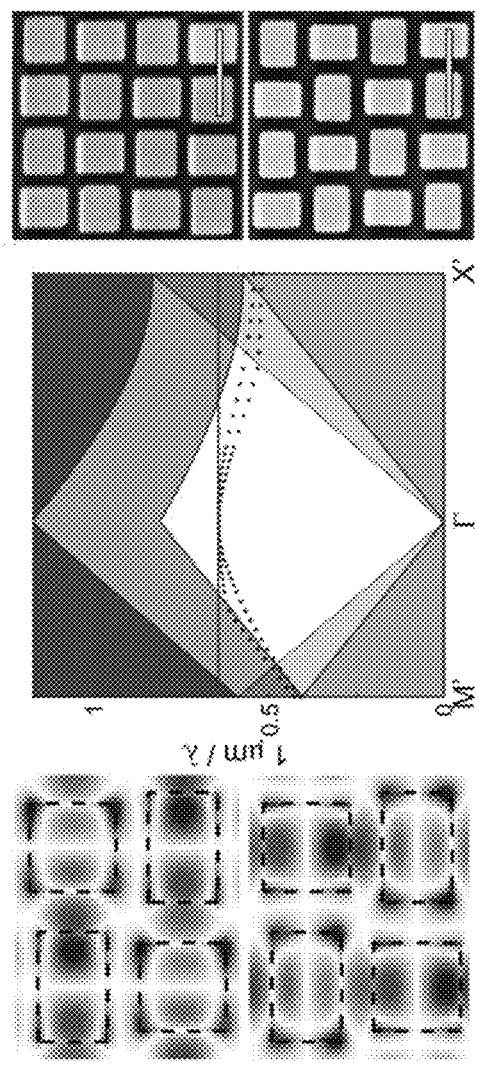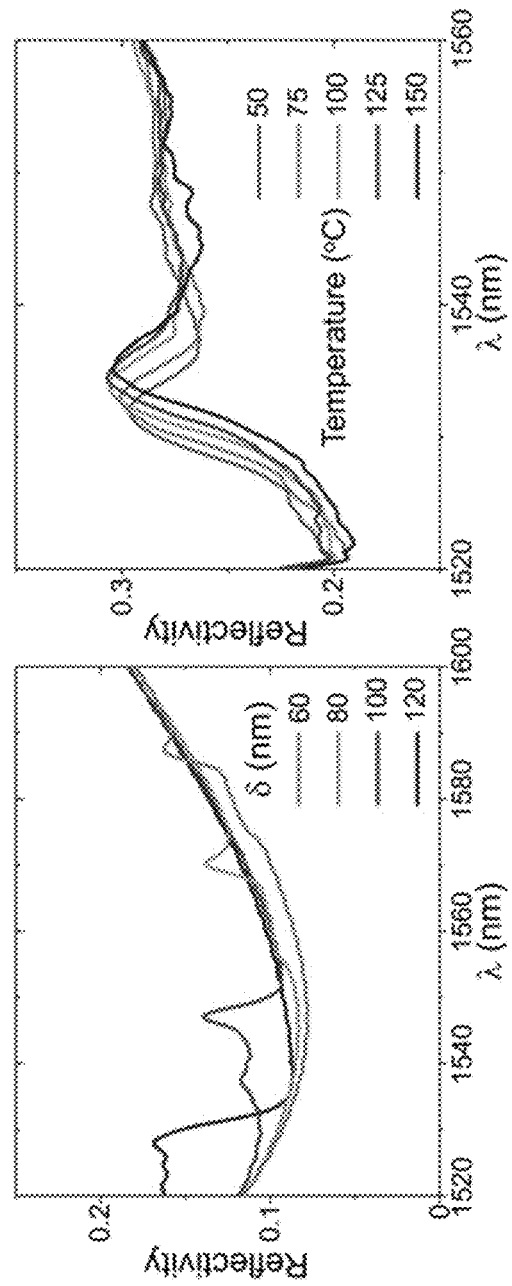
Fig. 12A Fig. 12B Fig. 12C Fig. 12D Fig. 12E

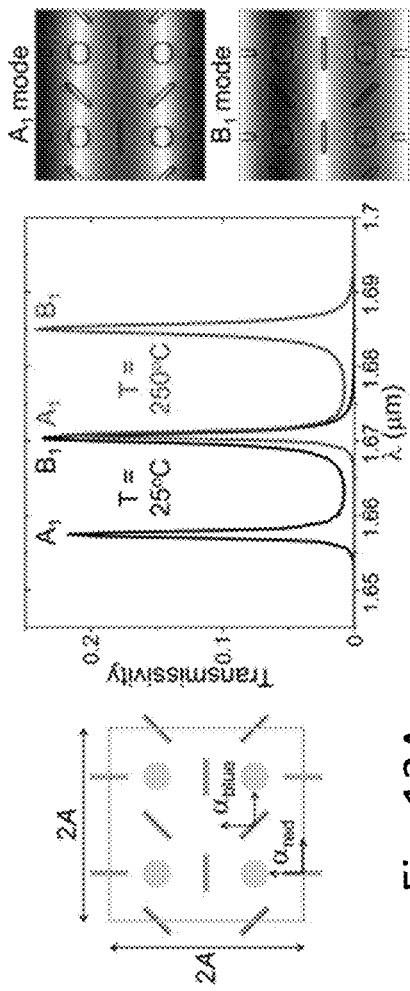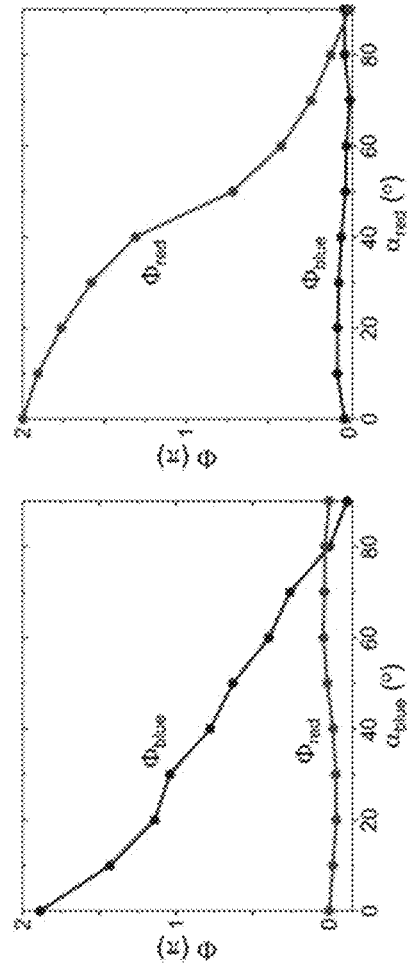
Fig. 13A
Fig. 13B
Fig. 13C

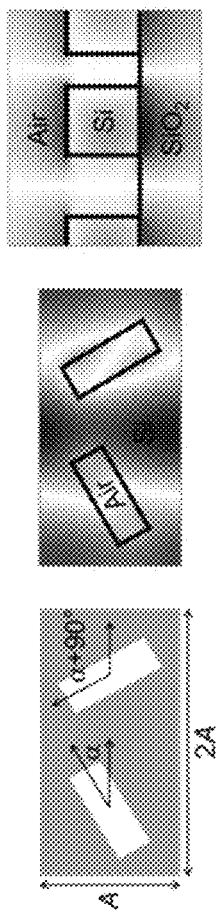
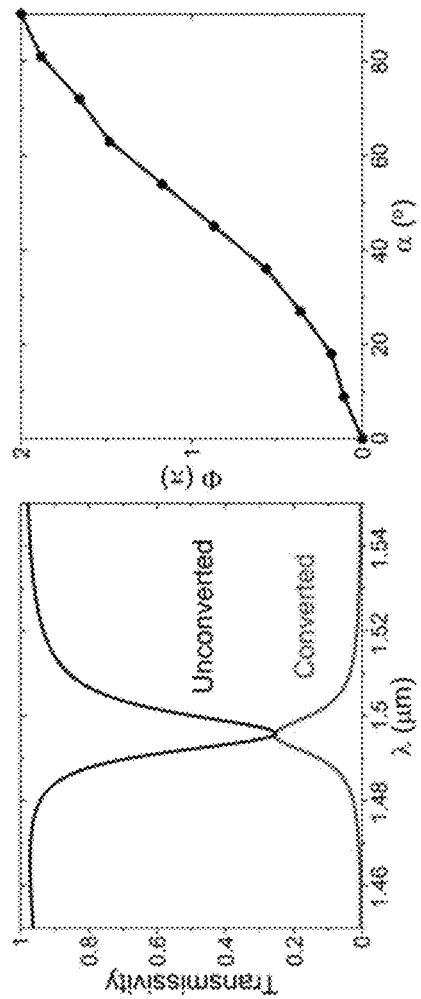
Fig. 14A
Fig. 14B
Fig. 14C
Fig. 14D
Fig. 14E

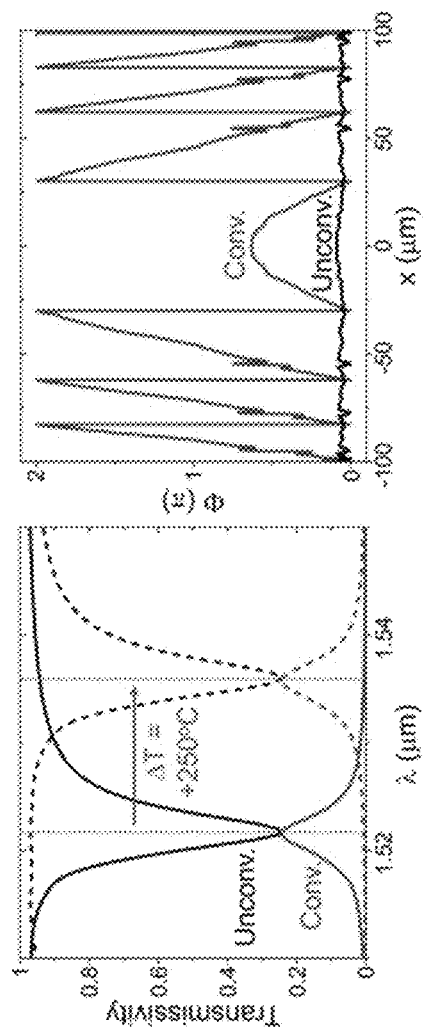
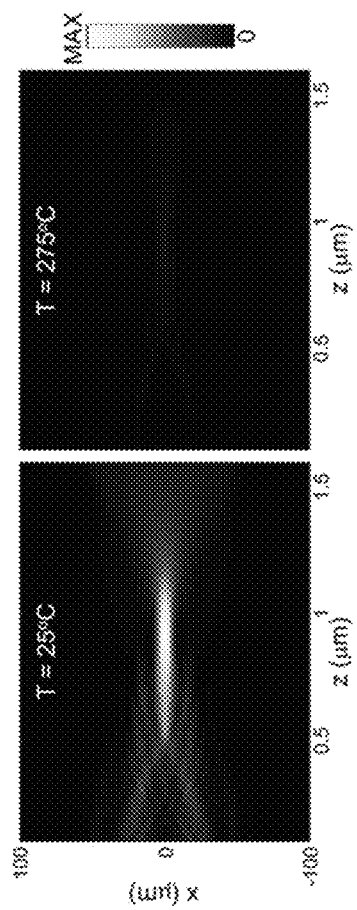
Fig. 14F
Fig. 14G
Fig. 14H

MULTIFUNCTIONAL RESONANT AND LEAKY-WAVE METASURFACES BASED ON SYMMETRY-BREAKING PERTURBATIONS

CROSS-REFERENCE TO RELATED APPLICATION

This application claims priority to U.S. Provisional Patent Application No. 62/944,722, which was filed on Dec. 6, 2019, the entire contents of which are incorporated by reference herein.

GRANT INFORMATION

This invention was made with government support under grant number HR0011-17-2-0017 awarded by the Defense Advanced Research Projects Agency (DARPA) and FA9550-14-1-0389 from the Air Force Office of Scientific Research (AFOSR) Multidisciplinary Research Program of the University Research Initiative (MURI). The government has certain rights in the invention.

BACKGROUND

Metasurfaces can be structured planarized optical devices with a thickness thinner than or comparable to the wavelength of light. Certain local metasurfaces can tailor the optical wavefront through the independent response of each meta-unit. Certain nonlocal metasurfaces can produce an optical response dominated by collective modes over several meta-units.

Certain local metasurfaces can be used to impart spatially varying phase distributions that shape the impinging optical wavefront to achieve functionalities such as lensing and holography. However, such devices have limited spectral control. Since the optical interactions with the meta-units are confined to deeply subwavelength structures and are necessarily broadband, the wavefront deformation is extended over a wide frequency range. Although certain nonlocal metasurfaces (e.g., guided-mode resonance gratings and photonic crystal slabs (PCSs)) can produce sharp spectral features, they lack the ability to spatially tailor the optical wavefront at the same time.

Therefore, there is a need for techniques for shaping the optical wavefront exclusively at the selected wavelengths, leaving the optical wavefront at other frequencies unchanged.

SUMMARY

The disclosed subject matter provides techniques for spatial and spectral modulation of light. A system for modulating light can include a substrate and a plurality of meta units. The meta units can be patterned on the substrate and configured to spatially and spectrally modulate the light. In non-limiting embodiments, the plurality of meta units can include a spatially distributed perturbation and form a perturbed photonic crystal lattice supporting a quasi-bound state in the continuum (quasi-BIC), which can be a radiative state with a quality factor (Q-factor) controllable by the perturbation strength.

In certain embodiments, the substrate can be transparent to the light. In non-limiting embodiments, the substrate can include a glass substrate, a silicon substrate, or other material that is transparent to the light.

In certain embodiments, the perturbation can be a symmetry-breaking perturbation. In non-limiting embodiments, the symmetry-breaking perturbation can include a dimerization perturbation that doubles the period of the unperturbed photonic crystal lattice. In non-limiting embodiments, the perturbation can be a chiral perturbation supporting a quasi-BIC with any arbitrary polarization state. In non-limiting embodiments, the perturbation can be configured to be rotated to introduce a spatially distributed geometric phase.

In certain embodiments, the perturbed lattice can form a nonlocal metasurface that can modify the light at a predetermined wavelength range associated with an optical resonance. In non-limiting embodiments, the nonlocal metasurface can simultaneously transmit the light outside of the predetermined wavelength range without distortion. In some embodiments, the metasurface can be configured to modify an amplitude, a phase, and/or a polarization angle of the light, and a resonant wavelength and a Q-factor of the resonance.

In certain embodiments, the light can be originated from out-of-plane or in-plane.

The disclosed system can be configured to be a metalens. The metalens can modify a wavefront of the light at resonance with an engineered resonant wavelength, a Q-factor, and/or resonant wavelength dispersion. In certain embodiments, the lattice can include a plurality of spatially distributed perturbations and supports a plurality of quasi-BICs. In non-limiting embodiments, the perturbed lattice can form a nonlocal metasurface that can modify the light at a plurality of predetermined wavelength ranges associated with a plurality of optical resonances and simultaneously transmit the light outside of the predetermined wavelength ranges without distortion.

In certain embodiments, the metasurface can be configured to be a multi-wavelength metalens that can y modify the optical wavefront at each of the multiple optical resonances.

In certain embodiments, the multi-wavelength metalens can include two sets of perturbations on a single metasurface. The first perturbation introduces one quasi-BIC at one resonant wavelength and the second perturbation introduces a second quasi-BIC at a second resonant wavelength. As a result, the metalens can focus light at two wavelengths while leaving the wavefront flat over the rest of the spectrum.

In certain embodiments, the meta units can include a passive dielectric material. The passive dielectric material can include silicon, silicon dioxide, titanium dioxide, silicon nitride, or combinations thereof. In certain embodiments, the meta units can contain an actively tunable material. The actively tunable material can include an electro-optical material, such as silicon and lithium niobate, a thermo-optical material, such as silicon and germanium, and a phase change material, such as vanadium dioxide. In non-limiting embodiments, the actively tunable materials can perform dynamic tuning of the resonant wavelength of the quasi-BIC and dynamic modification of the optical wavefront.

In certain embodiments, the disclosed subject matter provides a compound metasurface. The compound metasurface can include a plurality of substrate surfaces and a plurality of meta units. The meta units can be patterned on each of the substrate surfaces and can be configured to spatially and spectrally modulate the light. In some embodiments, the plurality of meta units can form a perturbed photonic crystal lattice supporting a quasi-BIC.

In certain embodiments, the compound metasurface can be configured to be a multi-wavelength metalens that can modify the optical wavefront at a plurality of wavelengths.

BRIEF DESCRIPTION OF THE DRAWINGS

The patent or application file contains at least one drawing executed in color. Copies of this patent or patent application publication with color drawings will be provided by the U.S. Patent and Trademark Office upon request and payment of the necessary fee.

FIGS. 1A-1C provide schematics illustrating three types of metasurfaces in accordance with the disclosed subject matter.

FIGS. 4A-4E provide diagrams and graphs showing an example design of a meta-unit library for nonlocal, wavefront-shaping metasurfaces and a resonant phase-gradient metasurface in accordance with the disclosed subject matter.

FIGS. 5A-5G provide diagrams and graphs showing an example resonant metalens in accordance with the disclosed subject matter.

FIGS. 6A-6E provide diagrams and graphs showing an example compound metasurface (i.e., a resonant metalens doublet) in accordance with the disclosed subject matter.

FIGS. 8A-8F provide diagrams and graphs showing an example demonstrated two-wavelength metalens in accordance with the disclosed subject matter.

FIGS. 11A-11E provide diagrams and graphs showing an example thermo-optical modulator based on a one-dimensional resonant metasurface in accordance with the disclosed subject matter.

FIGS. 12A-12E provide diagrams and graphs showing an example thermo-optical modulator based on a two-dimensional resonant metasurface in accordance with the disclosed subject matter.

FIGS. 13A-13E provide diagrams and graphs showing the design and operation of a multifunctional wavefront-shaping thermo-optic modulator in accordance with the disclosed subject matter.

FIGS. 14A-14H provide diagrams and graphs showing the design and operation of a multifunctional wavefront-shaping thermo-optic metalens in accordance with the disclosed subject matter.

Figure 2C:
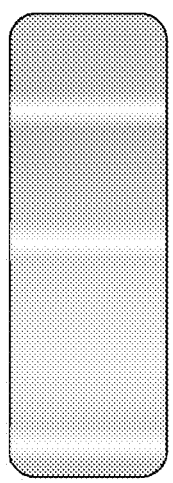
FIGS. 2A-2C provide schematics of three embodiments to realize hyperspectral wavefront shaping, where the optical wavefront is molded into distinct shapes at several selected wavelengths while the wavefront stays flat over the rest of the spectrum.

It is to be understood that both the foregoing general description and the following detailed description are exemplary and are intended to provide further explanation of the disclosed subject matter.

DETAILED DESCRIPTION

The presently disclosed subject matter provides techniques for spatial and spectral modulation of light. The disclosed techniques provide systems and methods for controlling a wavefront of the light.

Unless otherwise defined, all technical and scientific terms used herein have the same meaning as commonly understood by one of ordinary skill in the art. In case of conflict, the present document, including definitions, will control. Certain methods and materials are described below, although methods and materials similar or equivalent to those described herein can be used in the practice or testing of the presently disclosed subject matter. All publications, patent applications, patents, and other references mentioned herein are incorporated by reference in their entirety. The materials, methods, and examples disclosed herein are illustrative only and not intended to be limiting.

As used herein, the term "about" or "approximately" means within an acceptable error range for the particular value as determined by one of ordinary skill in the art, which will depend in part on how the value is measured or determined, i.e., the limitations of the measurement system. For example, "about" can mean within 3 or more than 3 standard deviations, per the practice in the art. Alternatively, "about" can mean a range of up to 20%, up to 10%, up to 5%, and up to 1% of a given value. Alternatively, particularly with respect to biological systems or processes, the term can mean within an order of magnitude, within 5-fold, and within 2-fold, of a value.

In certain embodiments, the presently disclosed subject matter provides a system for spatial and spectral modulation of light. Referring to FIGS. 1 and 2, an example system can include a substrate 101, one set of meta units 102, multiple sets of meta units separated into multiple layers 103, or multiple sets of meta-units located in a single layer 104. The meta units can be coupled to the substrate to form a metasurface, which can spatially and spectrally control the light. The term "coupled," as used herein, refers to the connection of a device component to another device component by methods known in the art. For example, the meta units can be coupled to the substrate through electron beam lithography, deep UV lithography, imprint lithography, or other methods known in the art. The type of coupling used to connect two or more device components can depend on the scale and operability of the device. In non-limiting embodiments, the disclosed device can control the wavefront of light that are originated either from out-of-plane (e.g., an incident plane-wave 105) or from in-plane (e.g., a waveguide mode 106). In non-limiting embodiments, the disclosed device can include a nonlocal, wavefront-shaping metasurface (FIG. 1, right), which can provide spatial control exclusively across its sharp spectral features. For example, the nonlocal, wavefront-shaping metasurface can mold optical wavefronts only at the resonant frequency while leaving the wavefronts over the rest of the spectrum unchanged.

In certain embodiments, the disclosed meta units can include a spatially distributed perturbation and form a perturbed lattice. An unperturbed form of the lattice can be a Photonic Crystal Slab (PCS), which includes optical materials (e.g., meta units) repeated periodically in 1 or 2 in-plane dimensions and supports a bound state in the continuum (BIC). The BIC can be a bound mode with infinite radiative quality-factors (Q-factors) despite being momentum-matched to free space. The perturbation can be a symmetry-breaking perturbation. The perturbation can transform the PCS supporting BICs into a metasurface supporting quasi-BICs with a finite Q-factor controllable by the strength of the perturbation.

In certain embodiments, a symmetry-breaking perturbation applied to a PCS can produce optical resonances under illumination from out-of-plane light, modifying light satisfying the resonant conditions but leaving unaffected light that does not satisfy the resonant conditions. For example, on a transparent substrate, the perturbed PCS can be configured to appear as a plain piece of glass at all non-resonant wavelengths but modifies light at a chosen narrow band of wavelengths within the linewidth of the resonance. An example list of symmetry-breaking perturbations (i.e., where and how to add perturbations to a PCS with either square or hexagonal lattice) and the resulting polarization of the quasi-BICs (i.e., to which incident polarization of out-of-plane light a quasi-BIC couple) is provided in FIG. 3.

In certain embodiments, the perturbation can be a spatially varying perturbation that can be periodic with an integer multiple of the unperturbed PC S's period. For example, the integer can be less than 4. When the integer is 2, the perturbation can be a dimerization perturbation (i.e., a perturbation that doubles the period of the unperturbed PCS along a real-space dimension). The perturbation can introduce resonant quasi-BICs that spectrally shape the light but leave untouched the direction and wavefront shape of the light. The perturbed PCS or metasurface can control the spectral linewidth or Q-factor of the resonance associated with the quasi-BIC by tuning the magnitude of the symmetry-breaking perturbation while abiding requirements on the modal symmetries. The metasurface can control the polarization angle of the light (e.g., choosing either a specific linear polarization or polarization-independent operation) by properly choosing the space group of the perturbation according to the tables in FIG. 3.

In certain embodiments, the disclosed system can include a spatially varying perturbation. For example, the orientation angle of the perturbation can vary spatially across the perturbed PCS, and the local linear polarization angle of the resonant quasi-BIC can be varied spatially. In this way, the coupling of a circularly polarized incident beam into a local resonant quasi-BIC with spatially varying linear polarization angles can produce a spatially varied "geometric phase" or "Pancharatnam-Berry phase." This local linearly polarized quasi-BIC radiates back into the free space, producing radiation with spatially varying linear polarization angles. The decomposition of this linearly-polarized radiation into two orthogonal circularly polarizations can introduce another factor of the geometric phase. The entire process, including the coupling-in and coupling-out, thus produces two factors of the geometric phase. For example, for right circularly polarized (RCP) incident light, the radiation with converted handedness (i.e., LCP light in transmission) can have a phase equal to two factors of the geometric phase. These factors can cancel for the radiation with unconverted handedness (i.e., the remaining RCP light in transmission). Because circularly polarized light can be composed of two orthogonal linear polarizations, only half of the power at the resonant wavelength of the incident light is coupled into the linearly polarized quasi-BIC in the perturbed PCS during the coupling-in process. Because linearly polarized light can be composed of two orthogonal circular polarizations, only half of the power at the resonant wavelength of the radiation has converted handedness of circular polarization during the coupling-out process. The geometric phase can be imparted onto a quarter of the incident light, and this portion of the light can have a modified wavefront.

In certain embodiments, the disclosed system can include out-of-plane symmetry breaking (i.e., perturbation with optical chirality or chiral perturbation) to improve the efficiency of optical control (e.g., up to 100%). By tuning the degree of chirality of the local symmetry breaking, the magnitude and sign of circular dichroism (i.e., dependence on the handedness of the incident circular polarization) can be fully controlled. This allows the disclosed devices to control all of the power of the resonant light with one handedness in reflection or transmission mode while leaving unaltered light at the resonant wavelength but with the opposite handedness of circular polarization. The wavefront shaping of the chosen handedness can have an efficiency of unity. In certain embodiments, by tuning the geometric phase (e.g., controlling the orientation angle of the chiral perturbation) and the degree of circular dichroism, both the phase and the amplitude of the resonant light can be controlled in a spatially varied manner. In certain embodiments, by changing the magnitude of the perturbation, the Q-factor can be controlled. In certain embodiments, by tuning the remaining geometric parameters (e.g., height of the PCS, period, size, and shape of the meta units in the unperturbed structure), the resonant wavelength and angular dispersion can be controlled. The disclosed device can provide complete control over an optical resonance: its amplitude (i.e., resonance visibility), phase, Q-factor, resonant wavelength, and angular dispersion.

In certain embodiments, the disclosed system can include multiple orthogonal perturbations (FIG. 2B) and thus support multiple quasi-BICs with distinct resonant wavelengths. For example, by adding N distinct perturbations that exclusively introduce N distinct symmetry classes of quasi-BICs (i.e., each perturbation in isolation controls one of the N classes but has no effect on the rest N−1 classes), a single perturbed PCS can control the Q-factor and resonant polarization angle (and associated geometric phase) of N sets of quasi-BICs simultaneously and independently, representing 2N fully and independently controlled degrees of freedom of the spectrum of the light. These degrees of freedom are wholly introduced in the perturbations added to an unperturbed PCS, whose geometric degrees of freedom (e.g., period in each in-plane dimension, thickness, size and shape of the periodic motif, optical materials used, etc.) can be tuned separately from the perturbations to control the wavelengths of the resonances and their angular dispersion.

In certain embodiments, the disclosed system can include a compound metasurface where multiple metasurfaces with distinct resonant wavelengths can be cascaded to achieve distinct functionalities at different wavelengths.

In certain embodiments, the disclosed system can provide a system for the manipulation of light originated from in-plane (i.e., integrated photonics). The light from in-plane can be incident on the device from an in-plane waveguide mode. While an unperturbed device (e.g., an unperturbed PCS) can support only bound modes (i.e., light does not scatter out-of-plane) at the frequencies of operation, a perturbed device can introduce distributed perturbations to produce controlled scattering of these otherwise bound modes to the out-of-plane direction. By controlling the magnitude of the perturbation, the amplitude of the locally scattered wave can be controlled. The polarization angle and geometric phase can be controlled by controlling the orientation angle of the perturbations. By spatially varying the perturbation, the out-of-plane scattered wavefront can be shaped in both amplitude and phase, producing, in the general case, a phase-amplitude hologram. By spatially varying the perturbation, the out-of-plane scattered wavefront can be shaped in both amplitude and polarization, producing, in the general case, a vectorial beam (e.g., a linearly, circularly, radially polarized, or azimuthally polarized beam). By using N distinct classes of perturbations, N orthogonal input waveguide modes can be controlled simultaneously and independently, producing, in the general case an N-color waveguide hologram.

In certain embodiments, the lattice can be further modified to control the wavelengths. For example, the square lattice can be modified into a rectangular lattice.

In certain embodiments, the disclosed system can be configured to be a metalens. The metalens can modify the optical wavefront at the resonant wavelength but leave the wavefront unaffected (i.e., flat) at off-resonant wavelengths. Wavefront shaping can be achieved by a spatial distribution of the geometric phase. The resonant wavelength, Q-factor, and resonant wavelength dispersion can all be engineered. In non-limiting embodiments, the resonant wavelength can be controlled by the geometry of the meta-units, the Q-factor by the magnitude of the perturbation, and the resonant wavelength dispersion by bandstructure engineering of the lattice. In certain embodiments, the diameter of the metalens can range from hundreds of micrometers to several centimeters. In non-limiting embodiments, the metalens can focus the incoming light in the visible, near-infrared, or mid-infrared spectral band, the Q-factor of the metalens can range from 10 to 10,000, and the numerical aperture of the metalens can range from 0.01 to 0.95.

In certain embodiments, the disclosed subject matter provides a compound metasurface. The compound metasurface can include a plurality of substrate surfaces and a plurality of meta units that can be patterned on each of the substrate surfaces and be configured to spatially and spectrally modulate the light. In some embodiments, the plurality of meta units can form a perturbed photonic crystal lattice supporting a quasi-BIC.

In certain embodiments, the compound metasurface can be configured to be a multi-wavelength metalens that can modify the optical wavefront at a plurality of wavelengths.

In certain embodiments, the compound metasurface can include multiple metalenses. For example, compound metasurface can have three metalenses. The first metalens can only focus light at one wavelength while leaving the wavefront flat over the rest of the spectrum, the second metalens can only focus light at a second wavelength while leaving the wavefront flat over the rest of the spectrum, and the third metalens only focuses light at a third wavelength, while leaving the wavefront flat over the rest of the spectrum. In non-limiting embodiments, the compound metasurface can include multi-wavelength metasurfaces to enable highly multifunctional systems. For example, a compound metasurface including three multi-wavelength metasurfaces, each supporting two quasi-BICs, can generate six distinct wavefronts at six wavelengths.

In certain embodiments, the disclosed subject matter can be used to create numerous devices working in the visible, telecommunication, mid-infrared, mm-wave, and microwave frequencies. For example, the disclosed system for manipulating light originating from out-of-plane can act as a reflective lens for incident circularly polarized light of specific wavelengths (e.g., a red light at 600 nm, a green light at 530 nm, blue light at 430 nm, and near-infrared light at 950 nm). The optical response of the reflective lens at all other wavelengths can be highly transparent (e.g., if the lens is composed of titanium dioxide or silicon nitride structures patterned on a glass substrate). In some embodiments, a user can look through the reflective lens without noticeable distortion to the external world, and a projection system using circularly polarized laser light can be combined with the reflective lens to superimpose contextual information on top of the users' vision of the external world (e.g., an augmented reality system or a transparent display system). In non-limiting embodiments, the reflective lens can be a multi-color system.

In certain embodiments, the disclosed system for modulating in-plane light can be used for augmented reality or a transparent display system. For example, the disclosed system can be fully transparent to out-of-plane incident light and produce full-color images projecting into the users' eye when light with specific wavelengths is coupled from the edges of the device.

In certain embodiments, the disclosed system for modulating in-plane light with large angular dispersion can operate on an input light at visible and/or telecommunication frequencies to realize a compact spectrometer that can separate broadband in-plane light into distinct points in the far-field. In non-limiting embodiments, the disclosed system can include a generalized grating coupler that can be used to couple out-of-plane light onto a photonic integrated circuit. The disclosed system with the grating coupler can be used for radially or azimuthally polarized light or any shaped input beam. In non-limiting embodiments, the disclosed system can include a generalized grating coupler that can be used to couple an in-plane guided mode to an out-of-plane vectorial beam. In some embodiments, by multiplexing two grating couplers, the disclosed system can include a polarimeter measuring the polarization state at a design wavelength by splitting the input light into two channels (x and y polarizations). By interfering with those channels, measured polarization intensity can be used to determine the relative phase of x and y polarizations. In non-limiting embodiments, by incorporating a thin-film-transistor array (e.g., arrays used in standard liquid crystal display technologies) to control a local liquid crystal orientation (e.g., with locally-controlled electrodes), the disclosed system can allow dynamic tuning of the amplitude and phase of an out-coupled optical wavefront.

EXAMPLES

Example 1: Resonant Wavefront-Shaping Metasurfaces

The disclosed subject matter provides a resonant metalens in the near-infrared that can focus light only on resonance and be otherwise transparent. This platform of stackable nonlocal metasurfaces readily allows for independent control of resonant wavelengths (via meta-unit geometry), Q-factors (via perturbation strength), resonant frequency dispersion (via bandstructure engineering), and wavefront (via spatial distribution of the geometric phase) at multiple wavelengths (via cascading and/or multiplexing distinct perturbations). These devices can expand the capabilities of multifunctional meta-optics to include active or nonlinear wavefront shaping by leveraging the increased light-matter interactions of the high Q-factor, wavefront-shaping resonances. Scaled to visible and near-infrared wavelengths, the disclosed resonant metasurfaces can be used for augmented reality and transparent display applications as compact multi-color see-through optics or for high-capacity, secure optical communications as volumetric metamaterials composed of rationally designed planarized layers that both spatially and spectrally encode information.

The disclosed subject matter provides dielectric metasurfaces that can offer both spatial and spectral control of light, realizing a metalens focusing light over a narrowband resonance while leaving off-resonant frequencies unaffected. The disclosed devices can realize such functionality by supporting a quasi-BIC encoded with a spatially varying geometric phase. The disclosed resonant metasurfaces can be cascaded to realize hyperspectral wavefront shaping, which can be used for augmented reality glasses, transparent displays, and high-capacity optical communications.

Certain metasurfaces, which are structured planarized optical devices with a thickness thinner than or comparable to the wavelength of light, can support a local response. For example, they can tailor the optical wavefront through the independent response of each meta-unit. In contrast, "nonlocal" metasurfaces can be characterized by an optical response dominated by collective modes over multiple meta-units. Certain local metasurfaces can be used to impart spatially varying phase distributions that shape the impinging optical wavefront to achieve functionalities such as lensing and holography. However, these devices can have limited spectral control: since the optical interactions with the meta-units are confined to deeply subwavelength structures, they are necessarily broadband, and the wavefront deformation is inevitably extended over a wide frequency range (FIG. 1A). Certain nonlocal metasurfaces, such as guided-mode resonance gratings and photonic crystal slabs, can produce sharp spectral features (FIG. 1B) since they can rely on high Q-factor resonant modes extending transversely over many unit cells. These modes, however, cannot at the same time spatially tailor the optical wavefront.

FIG. 1 provides schematics illustrating the distinction between three types of metasurfaces. The nonlocal or resonant, wavefront-shaping metasurface (FIG. 1C) disclosed here provides spatial control exclusively across its sharp spectral features. It molds optical wavefronts only at the resonant frequency while leaving the optical wavefronts impinging at other frequencies unchanged.

Example 2: Hyperspectral Wavefront-Shaping Metasurfaces

Figure 2B:
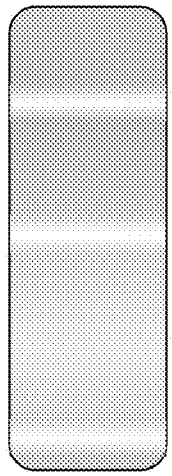
Figure 2A:
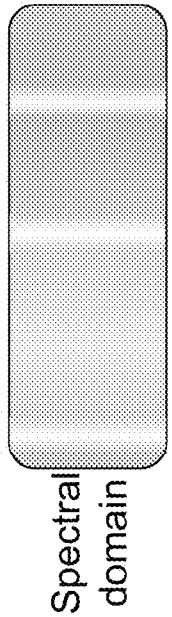
Figure 3A:
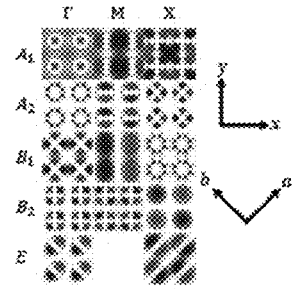
FIGS. 3A-3B provide an example catalog of perturbed photonic crystals supporting quasi-BICs in accordance with the disclosed subject matter.
Figure 3B:
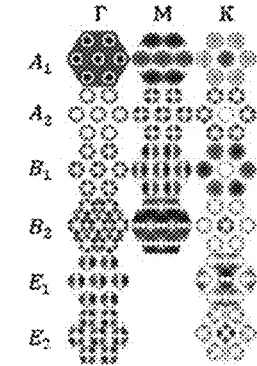

FIG. 2 shows several approaches to realize hyperspectral wavefront shaping. This can be achieved through a scalable rational design, in which the configuration of scatterers across the device is determined by reference to a precomputed library of meta units (FIG. 3). Since at non-resonant wavelengths, a resonant metasurface can leave the impinging beam undistorted, a stack of independently designed and operating resonant metasurfaces enables scalable hyperspectral systems exerting arbitrary control over spatial and spectral properties of light in a compact volume (FIG. 2A). Hyperspectral wavefront shaping can also be achieved by successively adding orthogonal symmetry-breaking perturbations to a single metasurface (FIG. 2B) so that the device can support several quasi-BICs and generate several distinct wavefronts. Hyperspectral wavefront shaping can be further demonstrated in an integrated photonics platform (FIG. 2C). In this implementation, light is coupled into the device from its edges as waveguide modes; each waveguide mode with a distinct frequency and polarization state (i.e., transverse-electric or transverse-magnetic mode) can be converted into a leaky-wave in the far-field with a distinctly tailored wavefront.

The combination of broadband transparency and wavelength-exclusive wavefront shaping can prove particularly useful for see-through lenses in augmented reality glasses that project contextual information into the eye only at narrowband wavelengths while simultaneously transmitting broadband light from the real world without distortion. The disclosed system can be used for transparent displays for next-generation screens, smart windows, and portable electronic devices that exclusively scatter RGB light while maintaining exceptional transparency across the rest of the visible spectrum. The disclosed system can also enable high-capacity, secure optical communications, where volumetric metamaterials composed of rationally designed resonant metasurface layers can encode information both spatially and spectrally. If translated to active or nonlinear media, the enhanced light-matter interactions can expand the capabilities of meta-optics to include dynamic wavefront modulation and signal-enhanced nonlinear wavefront shaping.

Example 3: Resonant, Phase-gradient Metasurface

The operating principles of the disclosed nonlocal, wavefront-shaping metasurfaces are rooted in the physics of periodic dielectric PCSs that support bound states in the continuum (BICs). BICs are bound modes with infinite radiative Q-factors despite being momentum-matched to free space. Applying a dimerizing perturbation (i.e., a perturbation that doubles the period along a real-space dimension) to such PCSs results in a quasi-BIC mode that is leaky to an extent controlled by the magnitude of the perturbation $\delta$, and excitable from free space with a finite radiative Q-factor that varies as $Q \propto 1/\delta^2$. There are many ways to dimerize a periodic structure, and the choice of symmetry-breaking perturbation can dictate which modes are excitable from free space and with which polarization state. The selection rules governing whether excitation of a mode is forbidden (BICs) or allowed (quasi-BICs) according to the symmetries of the mode, perturbation, and incident polarization, can be derived and cataloged for all crystallographic plane groups (FIG. 3).

One important finding in this context is that lattices belonging to the p2 plane groups (FIG. 4A) can have two degrees of freedom: one controlling the Q-factor and the other controlling the linear polarization state to which the quasi-BIC leaks. The in-plane orientation angle $\alpha$ of the dimerizing perturbation prescribes that incident light linearly polarized along the $\phi \sim 2\alpha$ direction can excite a quasi-BIC mode. When circularly polarized light is incident, this degree of freedom manipulates a geometric phase. For example, for right-handed circularly polarized (RCP) incidence, the phases of transmitted left-handed circularly polarized (LCP) and reflected RCP light vary as $\Phi = 2\phi \sim 4\alpha$ (while the optical phase of RCP light in transmission and LCP light in reflection is invariant to a). This can ensure that varying a in a dimerized p2 lattice enables resonant, wavefront-shaping metasurfaces. This $\Phi \sim 4\alpha$ geometric phase in nonlocal metasurfaces differs from the $\Phi = 2\alpha$ geometric phase that is used in broadband local metasurfaces, not only because it is a factor of two larger, but because it is only imparted onto light near a narrowband quasi-BIC resonance.

Figures 4D, 4E:
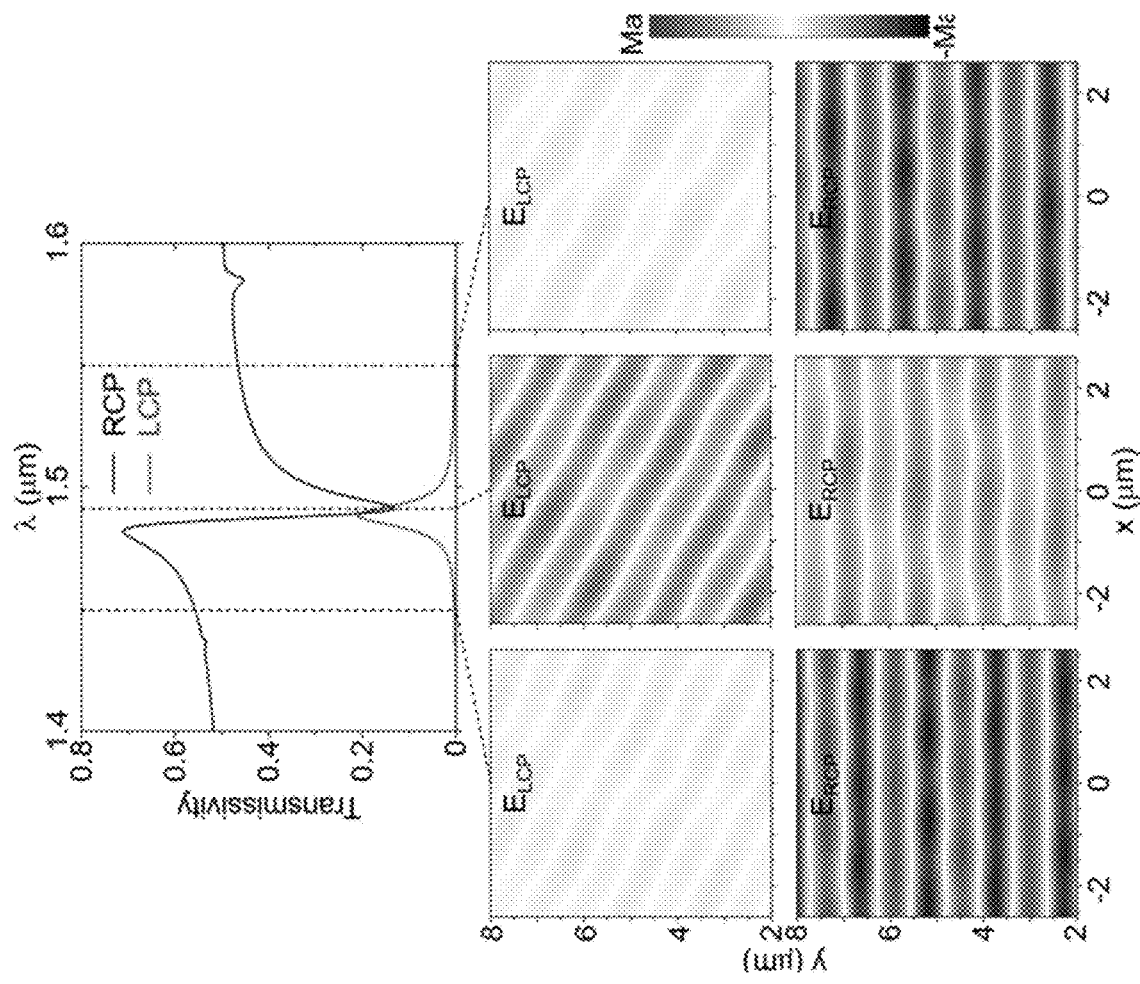

FIG. 4A shows a schematic of a meta-unit of a p2 plane group, generated by applying a dimerization perturbation of magnitude δ to a square lattice of square apertures. FIG. 4B illustrates simulations showing that the geometric phase Φ of light of converted handedness of circular polarization is approximately four times of the orientation angle α of the dimerizing perturbation. In this example, the meta-unit has a dimension of A×2A=450 nm×900 nm, the rectangular apertures have a dimension of (L−δ)×(L+δ)=125 nm×375 nm and are etched in a 125-nm silicon thin film on a glass substrate. FIG. 4C provides a schematic of a super-period of the resonant phase-gradient metasurface, consisting of 12 meta-units with spatially varying a. FIG. 4D provides simulated transmission spectra of the phase-gradient metasurface for the light of the converted and unconverted handedness of circular polarization. The converted LCP light has a resonant peak with a Q-factor of ~130. FIG. 4E provides simulated far-field electric-field profiles of the resonant phase-gradient metasurface, showing that beam steering (to a 33° angle) only occurs on resonance for the light of converted handedness and that the device remains largely transparent for non-resonant light.

Example 4: Single-Wavelength, Resonant Metalens

Figure 5B:
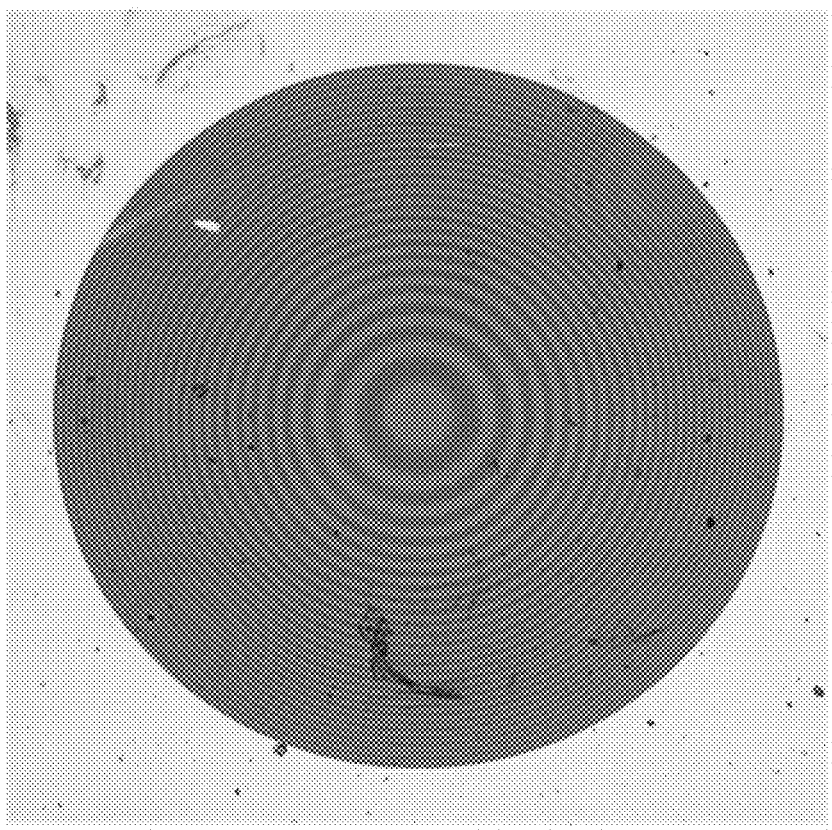
Figure 5A:
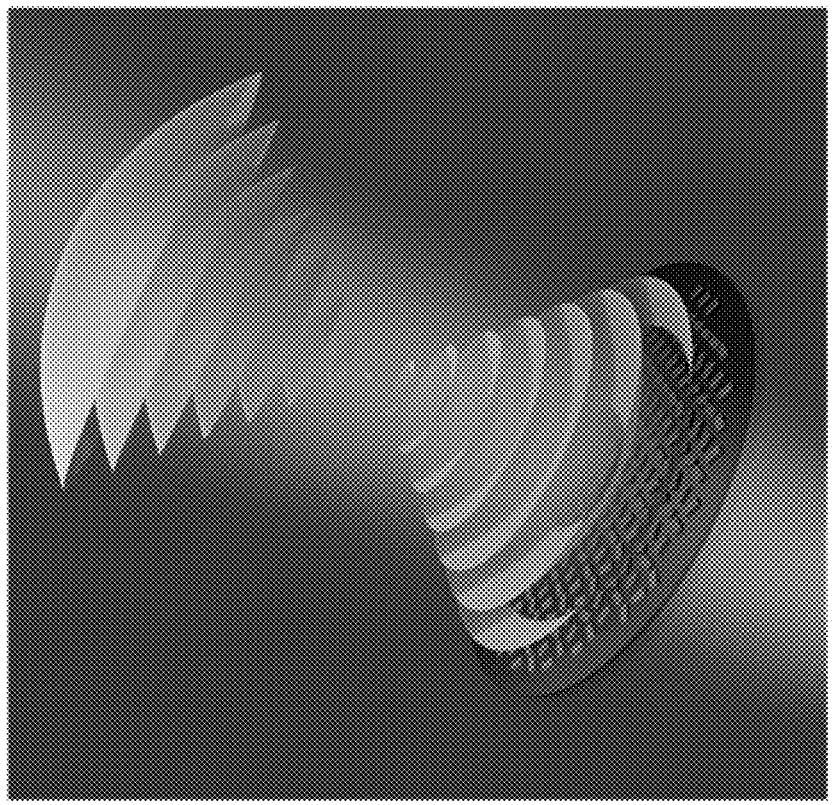

Using the meta-unit library in FIG. 4A, a radial metalens was fabricated with NA=0.2 and a diameter of 800 μm (FIGS. 5A-C). FIG. 5A provides a schematic showing the resonant operation of the metalens (e.g., light on resonance being focused, while the rest shown in white passing the lens without distortion). FIG. 5B provides a photograph of the metalens with a diameter of 800 μm. FIG. 5C provides a scanning electron microscope (SEM) image of a portion of the device. This metalens has a resonance centered at λ=1590 nm with a Q-factor of ~86 and maximum conversion efficiency of ~8% of the incident power, as indicated by the transmission spectra in FIG. 5D. A series of transverse two-dimensional (2D) far-field scans shows that focusing is most efficient at the center of the resonance, λ=1590 nm, with the focusing efficiency dropping at the two shoulders of the resonance, λ=1575 nm and 1600 nm, and that the focal spots become almost undetectable at wavelengths tens of nanometers away from the center of the resonance (FIG. 5E). Longitudinal 2D far-field scans of the device (FIG. 5F) reveal that the focal spots at resonance (λ=1575-1600 nm) are orders of magnitude brighter than the focal spots off-resonance, following a Lorentzian line shape. The device is functionally transparent off-resonance. The background plane-wave is estimated to be three to four orders of magnitude stronger in power than the focal spots at off-resonance wavelengths. The focal spot at resonance is diffraction-limited: vertical and horizontal linecuts of the focal spot at resonance (FIG. 5G) reveal Strehl ratios (estimated from the Airy disc and first ring of the intensity pattern) of 0.89 and 0.85 in the x and y directions, respectively.

Example 5: Resonant Metalens Doublet

Cascading multiple nonlocal metalenses with distinct resonant wavelengths can enable multifunctional devices. The broadband transparency and independent design and operation of each constituent layer can provide a scalable platform for hyperspectral wavefront shaping (FIG. 2A). A proof-of-principle implementation was shown in the form of a resonant metalens doublet that can focus light at two selected wavelengths. This doublet includes a converging cylindrical lens with NA=0.1 resonant at a shorter wavelength λ=1450 nm and a diverging radial lens with NA=0.2 resonant at a longer wavelength λ=1590 nm. They are arranged such that they share the same focal plane located between the two elements (FIG. 6A), but they can be rearranged as desired. FIG. 6A provides schematics showing the operation of the components of the doublet in isolation (left and middle panels) and combined (right panel). Both elements are devised from meta-unit libraries of rectangular apertures etched in a 125-nm thick silicon film on glass for convenience, but each element could be based on a different material platform or with a different meta-unit motif for more advanced functionalities. The radial lens is the same device as FIG. 5, acting here as a diverging lens because the handedness of circularly polarized incident light can be switched. Compared to this design, the meta-unit library for the cylindrical lens has smaller dimensions (i.e., A=410 nm, (L−δ)×(L+δ)=100 nm×350 nm) to blueshift the resonant wavelength to λ=1450 nm with Q~65 (FIG. 6B). Longitudinal far-field scans of the doublet in the region between its two elements (FIGS. 6D and 6E) confirm the focusing behavior of the cylindrical lens at λ=1445 nm and the radial lens at λ=1580 nm. Multi-wavelength transverse far-field scans at the focal plane (FIG. 6C) show that at λ=1450 nm, one element of the doublet (the cylindrical lens) generates a focal line, while at λ=1600 nm, the other element of the doublet (the radial lens) produces a focal spot. Off resonance, there is a minimal transmission of handedness-converted light, a plane wave transmits through the doublet with no polarization conversion nor wavefront deformation.

Several different combinations of nonlocal metasurfaces, each with distinct wavefront shaping capability, can be cascaded, as long as no elements share a common resonant wavelength.

Hyperspectral wavefront-shaping is not readily attainable in stacks of conventional local metasurfaces, which mold wavefronts with limited spectral selectivity: Diffractive dispersion and large propagation lengths between elements are required to first spatially separate color components before manipulating each wavefront individually and then recombining the colors. The cascaded or compound metalenses have less stringent design constraints in terms of the number of wavelengths, wavelength spacing, and material selection than previous works reporting multifunctional metasurface devices. In the disclosed device, each of the cascaded metasurfaces can have its own independent substrate, but future devices could be stacked into an integrated substrate with successive independently operating layers spaced only a few wavelengths apart, creating a meta-optical volume with an unprecedented command of light.

Figure 7A:
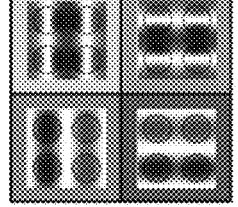
FIGS. 7A-7E provide diagrams and graphs showing characteristics of a multi-wavelength resonant metasurface in accordance with the disclosed subject matter.
Figure 7B:
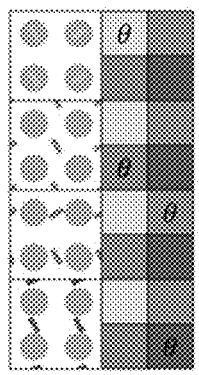

Example 6: Multi-Wavelength, Resonant Metasurfaces Based on Orthogonal Perturbations The functionality of nonlocal metasurfaces can be extended to multi-wavelength control by successively adding perturbations to a single metasurface, each capable of controlling the linewidth and geometric phase of separate quasi-BIC modes. Targetting four quasi-BIC modes of distinct symmetries (FIG. 7A), four distinct perturbations (i.e., adding/removing materials or increasing/decreasing local refractive indices, shown as rods in FIG. 7B) can be identified, and the selection rules (i.e., to which output polarization angle free-space coupling occurs upon perturbation) can be derived for each of the four modes. The results, depicted in FIG. 7B, show that each of the perturbations (with space group p2) couples a single quasi-BIC mode to a free-space output wave with polarization angle θ, while minimally interacting with the remaining three modes (coupling strength proportional to perturbation squared, which is exceedingly small). The angle θ depends on the orientation of the perturbation α following 0~2α. Using a polarization filter to select the circularly polarized component of the output wave, the geometric phase Φ=2θ~4α can be controlled independently of the amplitude by varying the in-plane orientation angle α of the perturbative "rods".

Figure 7C:
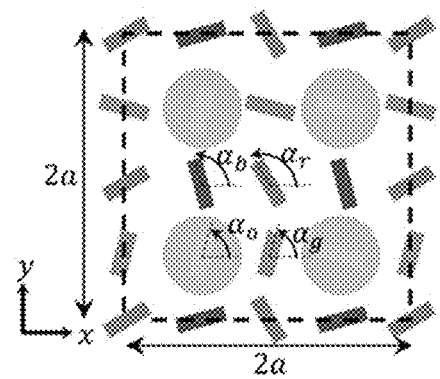
Figure 7D:
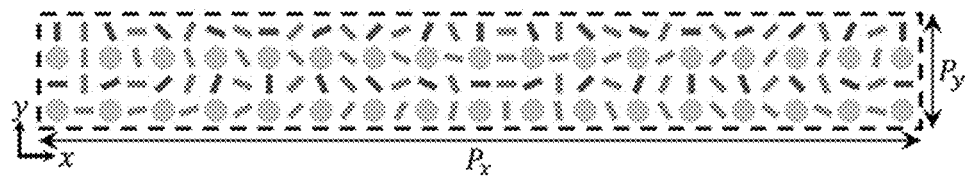
Figure 7E:
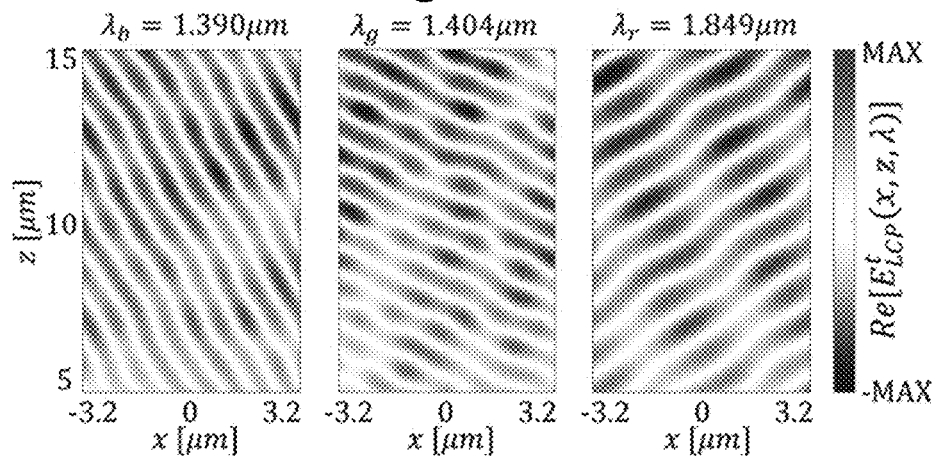

A meta-unit of the hyperspectral wavefront-shaping metasurface can be formed by putting all four perturbations together (FIG. 7C). By spatially varying the geometric phase of each quasi-BIC mode, a hyperspectral metasurface can be realized with four distinct phase profiles encoded by the four distinct perturbations. As a proof of principle, three such perturbations are applied to create the super period of a three-wavelength, resonant, phase-gradient metasurface, shown in FIG. 7D. Full-wave simulations confirm that, at the corresponding resonant wavelengths, three different phase gradients have been faithfully encoded for the output light, deflecting light with converted handedness of circular polarization to independent far-field angles (FIG. 7E).

The design and experimental results of a single-layer multifunctional resonant metasurface are shown in FIG. 8. The metasurface is demonstrated on a platform of rectangular apertures in a 200-nm thick silicon thin film on glass with a meta-unit geometry described in FIG. 8A. Each perturbation introduces a distinct quasi-BIC (FIG. 8B) whose geometric phase is controllable by the α of one set of apertures and not the other (FIG. 8C). Two orthogonal cylindrical lenses with NA~0.05 are implemented on the metasurface such that each set of perturbations produces the phase profile for a distinct cylindrical lens. An optical microscope image of the device with a dimension of 505 μm×505 μm is shown in FIG. 8D, and a scanning electron micrograph of a portion of the device is shown in FIG. 8E, where the scale bar represents 2 μm. Imaging handedness-converted light on the focal plane reveals a horizontal focal line at λ=1385 nm, a vertical focal line at λ=1460 nm, and mostly flat wavefronts at non-resonant wavelengths (FIG. 8F).

Example 7: High-Efficiency, Resonant Metasurfaces Based on Chiral Perturbations

Figure 9C:
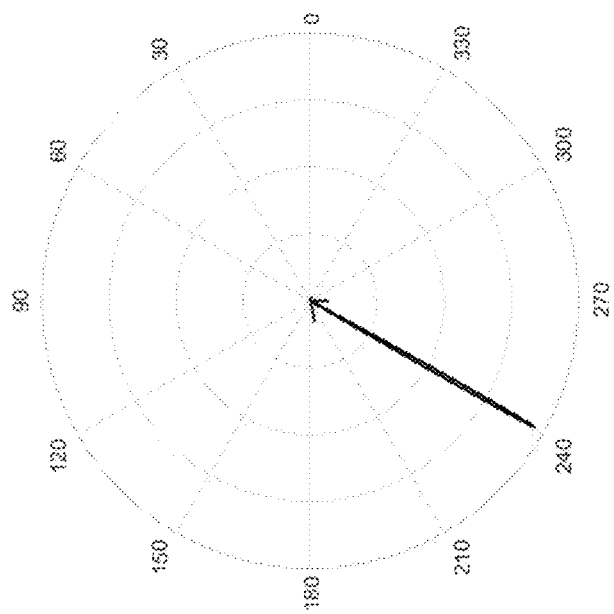
FIGS. 9A-9E provide an example of a high-efficiency, resonant, phase-gradient metasurface based on chiral perturbations in accordance with the disclosed subject matter.
Figure 9A:
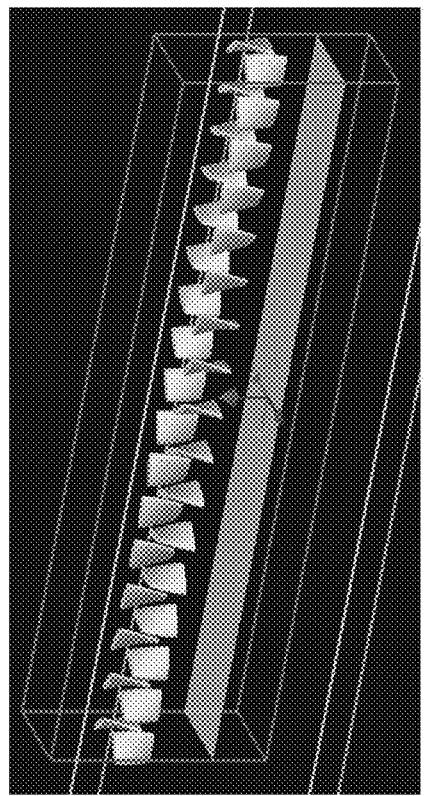
Figure 9B:
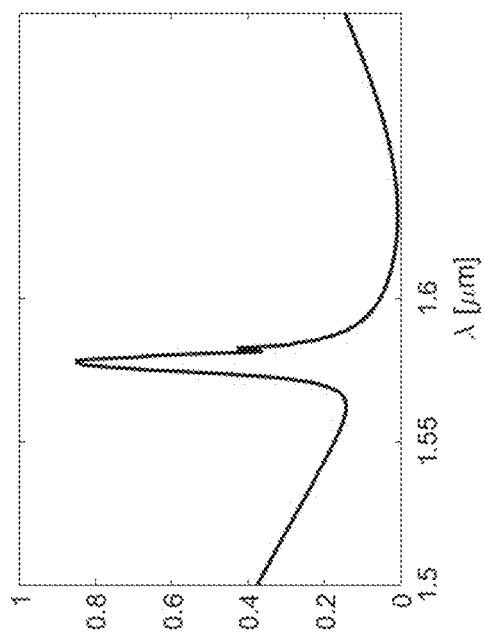
Figure 9D:
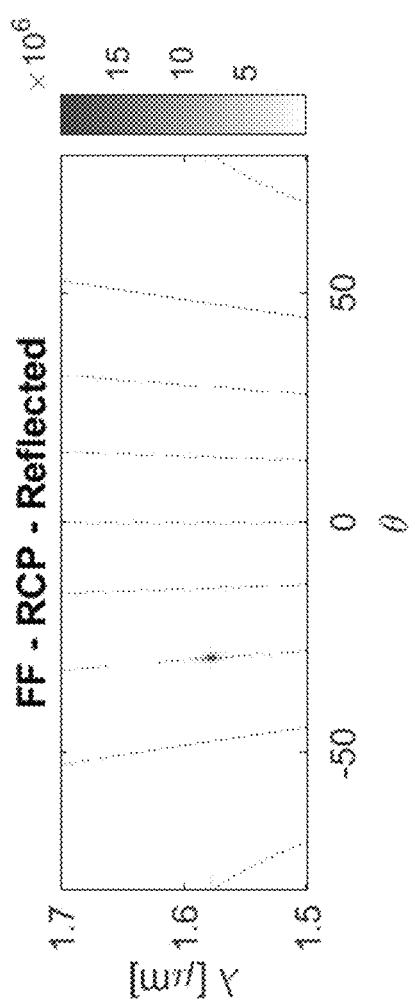
Figure 9E:
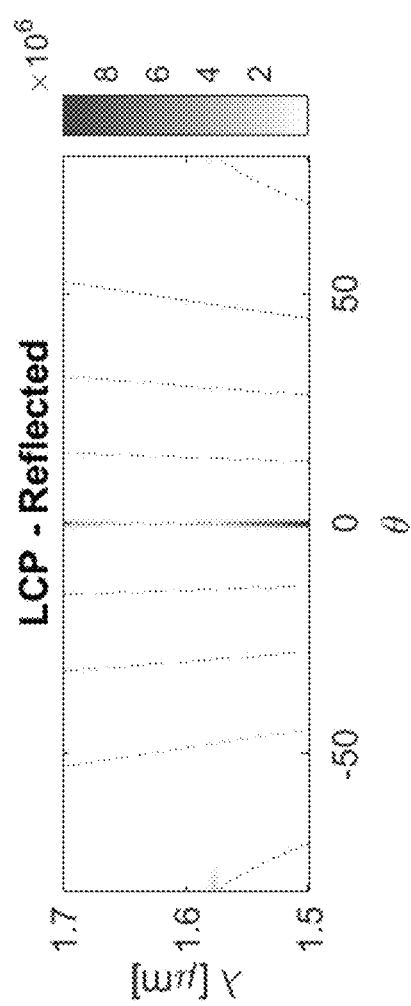

FIG. 9A shows the super period of a high-efficiency, resonant, phase-gradient metasurface based on chiral perturbations, where chirality is introduced and controlled by twisted meta units. Full-wave simulations show that when an RCP plane-wave is normally incident onto the metasurface, 85% of the optical power on resonance can be deflected to the desired reflected diffraction order (FIGS. 9B and 9C). FIGS. 9D and E show simulated spectral-angular far-field intensity distributions on the reflection side for RCP and LCP, confirming deflection of 85% of the light only for light with converted handedness on resonance.

Figure 10A:
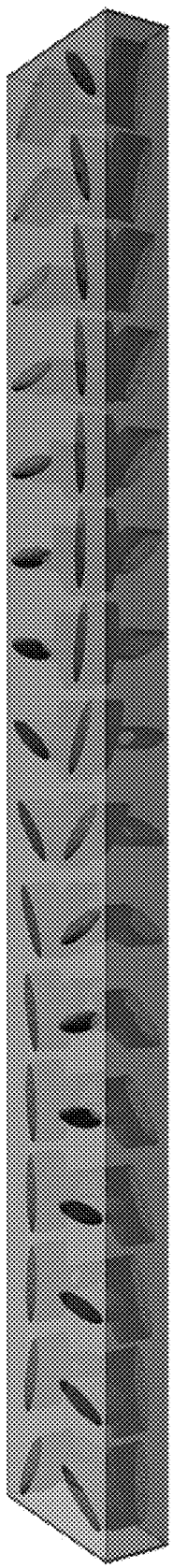
FIGS. 10A-10C provide another example of a high-efficiency, resonant, phase-gradient metasurface based on chiral perturbations in accordance with the disclosed subject matter.
Figure 10C:
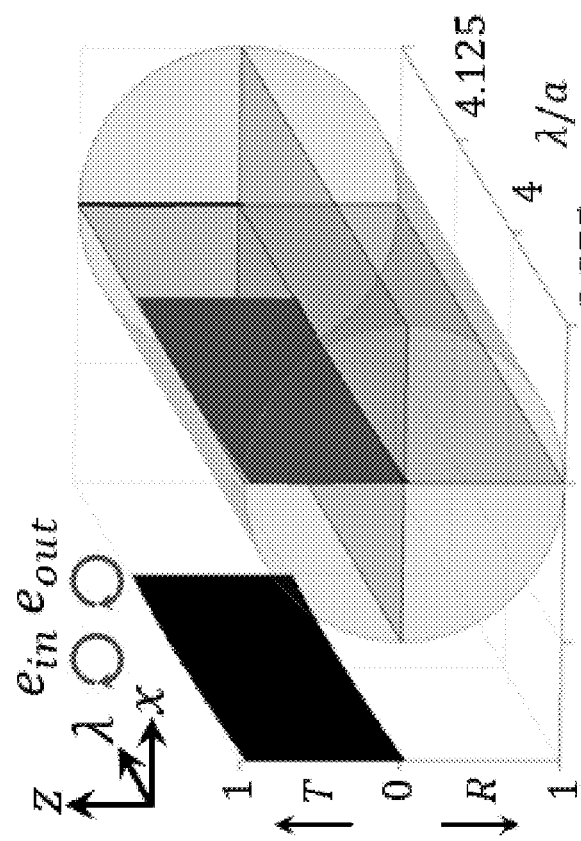
Figure 10B:
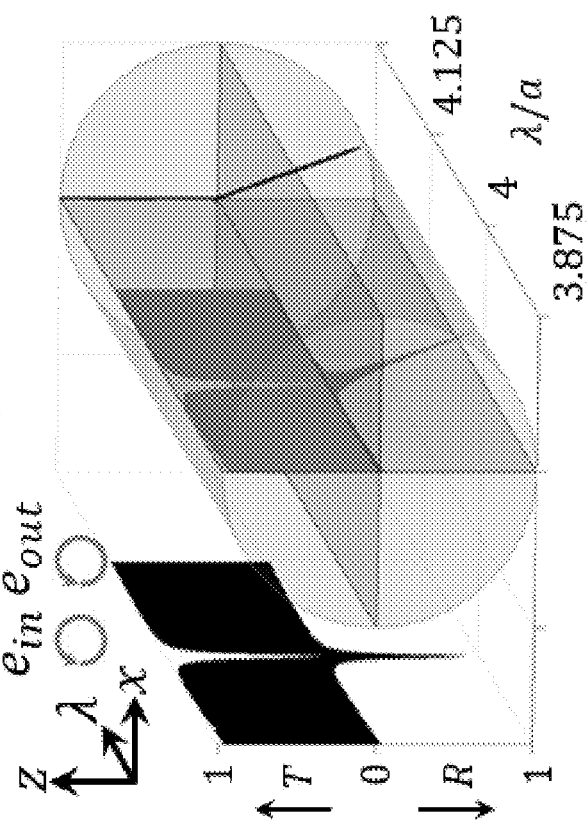

FIG. 10 shows the design and simulation results of another resonant, phase-gradient metasurface containing chiral perturbations and achieving 100% efficiency. The super-period of the metasurface (FIG. 10A) consists of two layers of meta units and chirality is introduced and controlled by the distinct angular orientations of the meta units on the two layers. Full-wave simulations show that when RCP light is incident at the resonant frequency and at normal incidence, 100% of optical power is reflected back and steered towards an oblique angle, whereas when LCP light is incident, it has a unity transmission across the whole spectrum.

Example 8: Dynamically Tunable Resonant Metasurfaces

FIG. 11 shows an experimental demonstration of a thermo-optical modulator based on 1D resonant meta-gratings. The meta-grating is made of silicon, which is a common choice of active material with a thermo-optic coefficient of ~2×10-4 $K^{-1}$ near telecommunications wavelengths. The meta-grating is created by a 1D dimerization perturbation, which can either be a "gap perturbation" where the gap size between grating fingers alternates between two values, or a "width perturbation" where the width of every other finger alternates between two values. In both cases, the perturbation doubles the period of the structure in real space, which halves the period in k-space. This effectively folds the first Brillouin zone, resulting in $0^{th}$-order diffractive modes excitable from free space (above the light line) in the perturbed structure that were bound modes (below the light line) in the unperturbed structure.

A gap perturbation is chosen here, as shown in FIG. 11A, and the perturbation strength δ is the difference in the widths of adjacent gaps. The structure supports a flat band near λ=1.55 μm (FIG. 11B). The electric-field mode profile (FIG. 11A) for excitation polarized parallel to the fingers has a good overlap with the silicon fingers. The devices are fabricated on a silicon-on-insulator substrate with electron beam lithography and dry etch with an alumina hard mask. A set of devices are demonstrated with a footprint of 500 μm×500 μm and varying perturbation strengths (FIG. 11C). The latter control the optical lifetime with smaller perturbations producing higher measured Q-factors of up to —300 (FIG. 11D). Measurements of the reflection spectra of these devices over a 100° C. temperature range show a 4.6-nm shift in the resonant wavelength and an extinction ratio of 2.4 at 2=1549 nm (FIG. 11E).

Polarization-insensitive thermo-optic modulators in silicon are also demonstrated. According to the selection-rule catalog (FIG. 3), polarization-insensitive behavior requires degenerate E-type modes that are preserved by four-fold rotational symmetry. A 2D structure belonging to the p4g plane group is chosen as depicted in FIG. 12A and the period and fill factor of the structure is adjusted to minimize the band curvature for a mode at the telecommunications wavelengths (FIG. 12B). The out-of-plane electric-field profiles on resonance of the degenerate modes for x- and y-polarized incident light show a large modal overlap with the metasurface (FIG. 12A). Devices with a range of perturbation strengths are fabricated (FIG. 12C) and a Q-factor as high as ~600 is experimentally obtained for a device consisting of rectangular silicon pillars with in-plane dimensions of 505 nm×425 nm (i.e., δ=80 nm) (FIG. 12D). For a device with Q-factor of —290, measured reflection spectra show a 3.2-nm shift in resonant wavelengths over a 100° C. temperature range and an extinction ratio of 1.18 at λ=1529 nm (FIG. 12E).

Figure 13D:
Figure 13E:
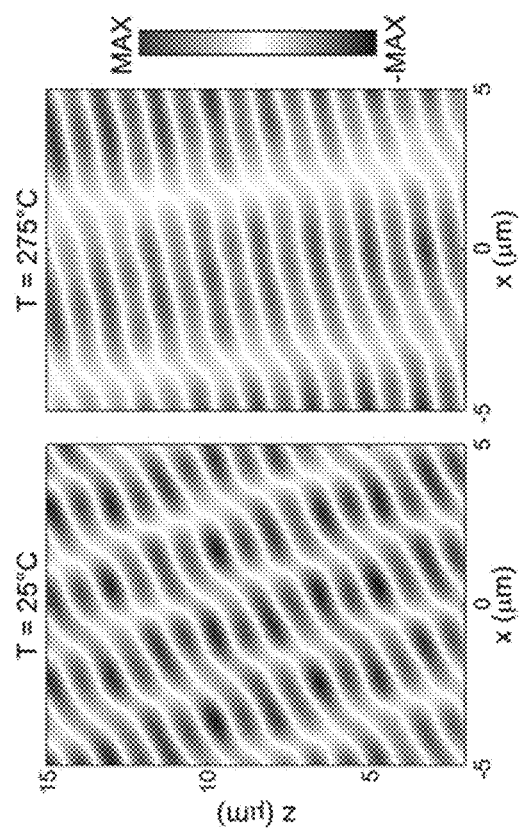

FIG. 13 shows the design and simulated performance of a thermally switchable multifunctional nonlocal metasurface. FIG. 13A shows a schematic of the meta-unit consisting of apertures defined in a silicon thin film: circular apertures represent the unperturbed structure, and apertures represent two orthogonal perturbations. Near telecommunications wavelengths, this meta-unit supports two quasi-BICs (FIG. 13B right panels) each controlled by a separate perturbation such that rotating one set of apertures controls the geometric phase of the redshifted mode following an approximately $\Phi_{red}=4\alpha_{red}$ relation but has negligible impact on the blueshifted mode (FIG. 13C right panel). Conversely, the other set of apertures impart a geometric phase $\Phi_{blue} \sim 4\alpha_{blue}$ to the blueshifted mode but not the redshifted one (FIG. 13C left panel). With this meta-unit library, a device is devised such that each of the orthogonal perturbations is tiled to create a distinct phase profile, leading to anomalous refraction of light to a distinct angle. In this way, when the two quasi-BIC resonances are thermo-optically swept through the laser frequency, two distinct beam steering angles can be obtained at two operation temperatures. A schematic super period of this device is shown in FIG. 13D. The far-field electric-field profiles at λ=1649 nm of light with converted circular polarization confirm that light is refracted to a 35-degree angle at 25° C. and a 16.7-degree angle at 275° C. (FIG. 13E).

FIG. 14 shows the design and simulated performance of a thermally switchable nonlocal metalens. Meta units with the p2 plane group are chosen. The meta units consist of rectangular apertures in silicon (FIG. 14A) and support a quasi-BIC mode with Ai symmetry as shown in the transverse and longitudinal cross-sections of the mode profile (FIGS. 14B and 14C) to ensure a large modal overlap with the active material, silicon, for efficient thermo-optic modulation. For this mode, there is a Lorentzian transmission peak with Q~150 for light of converted circular polarization and a dip for light of unconverted circular polarization (FIG. 14D). Simulations show that the geometric phase follows the $\Phi \sim 4\alpha$ relationship (FIG. 14E). Meta-units with different values of a and thus different phase responses can be tiled to form spatially varying phase profiles, creating devices such as lenses and beam deflectors. The resulting devices can shape the wavefront only on resonance and only for transmitted light of converted handedness of circular polarization. With this meta-unit library, a cylindrical metalens is created with a numerical aperture of 0.1 and a dimension along the phase profile direction of 200 μm. The phase profiles of the metalens for light with converted circular polarization and unconverted circular polarization are shown in FIG. 14G. Simulated transmission spectra of light with converted handedness of the device at 25° C. (refractive index of silicon of n=3.45) and 275° C. (n=3.50) show a shift in the resonant wavelength of 14.0 nm and an extinction ratio of 37.9 at λ=1521 nm (FIG. 14F). Simulated far-field distributions of the metalens at λ=1521 nm (FIG. 14H) demonstrate that the device acts as a lens at 25° C. but not at 275° C. where little light of converted handedness is transmitted. Hence for narrowband incident light the device exhibits thermally switchable functionalities between that of a lens and that of an unpatterned substrate.

Example 9: Leaky-Wave Metasurfaces

Figure 15B:
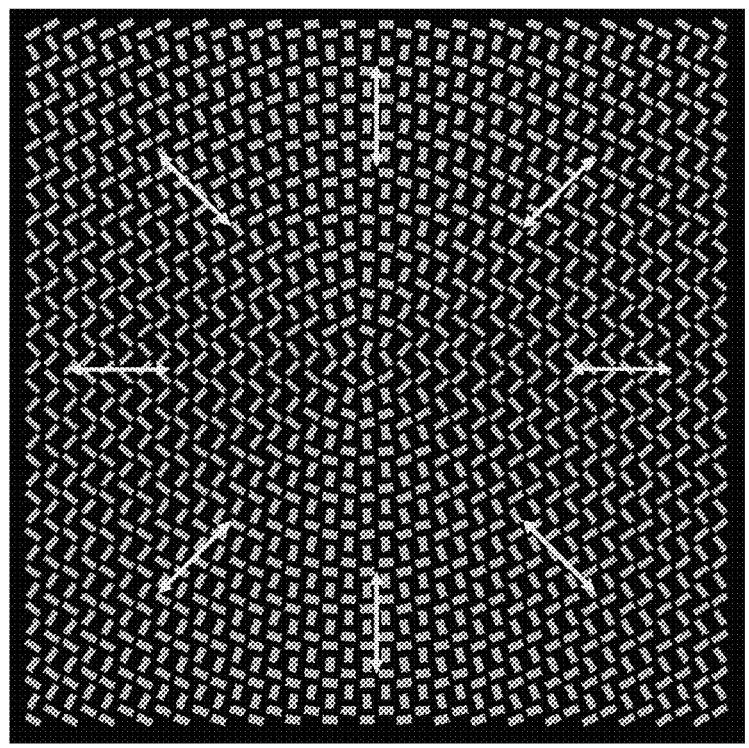
FIGS. 15A-15B provide diagrams showing the design and operation of an integrated resonant metasurface converting in-plane guided light into a radially polarized vector beam propagating in free space.
Figure 15A:
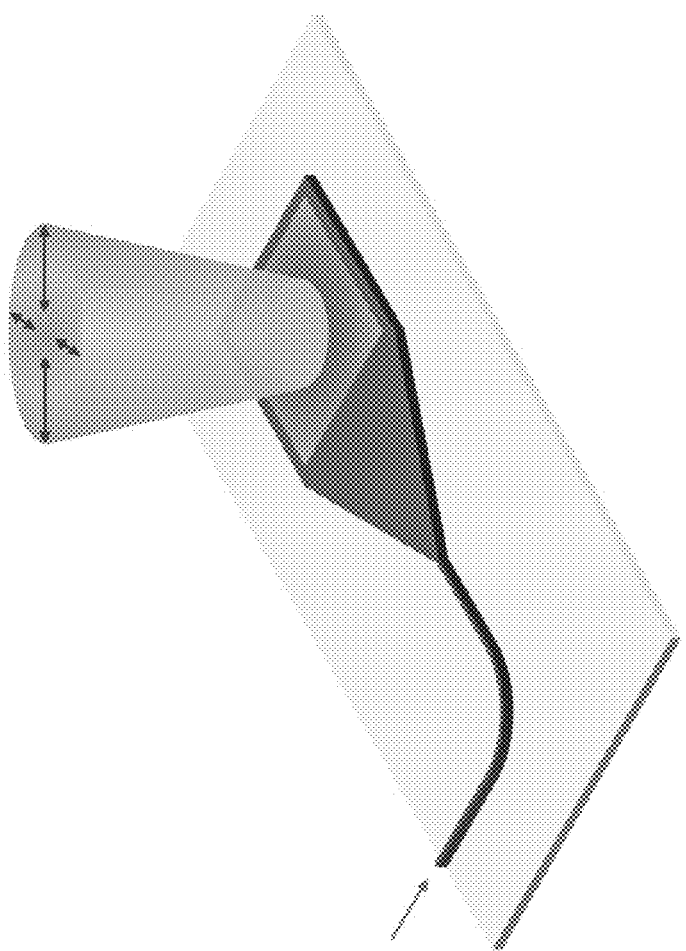
Figure 16B:
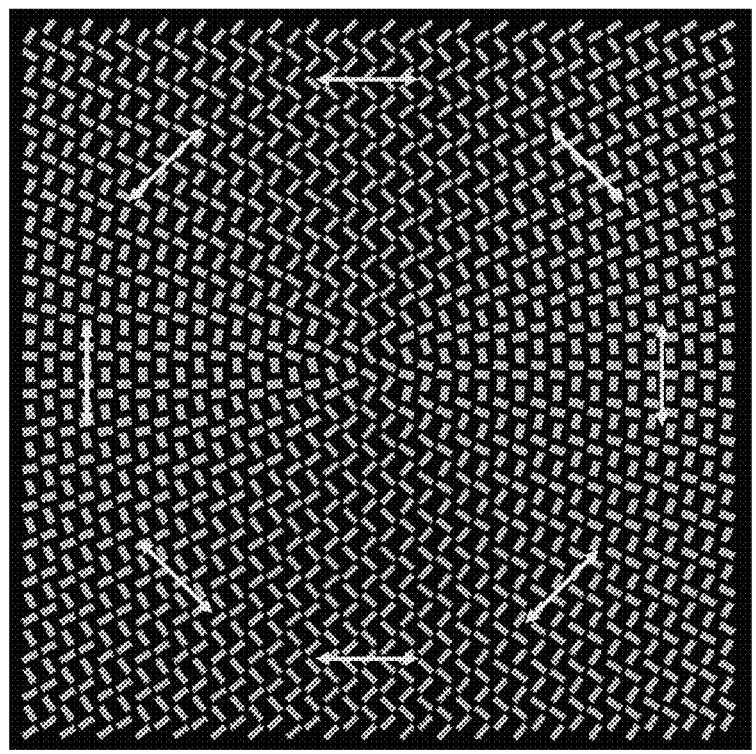
FIGS. 16A-16B provide diagrams showing the design and operation of an integrated resonant metasurface converting in-plane guided light into an azimuthally polarized vector beam propagating in free space.
Figure 16A:
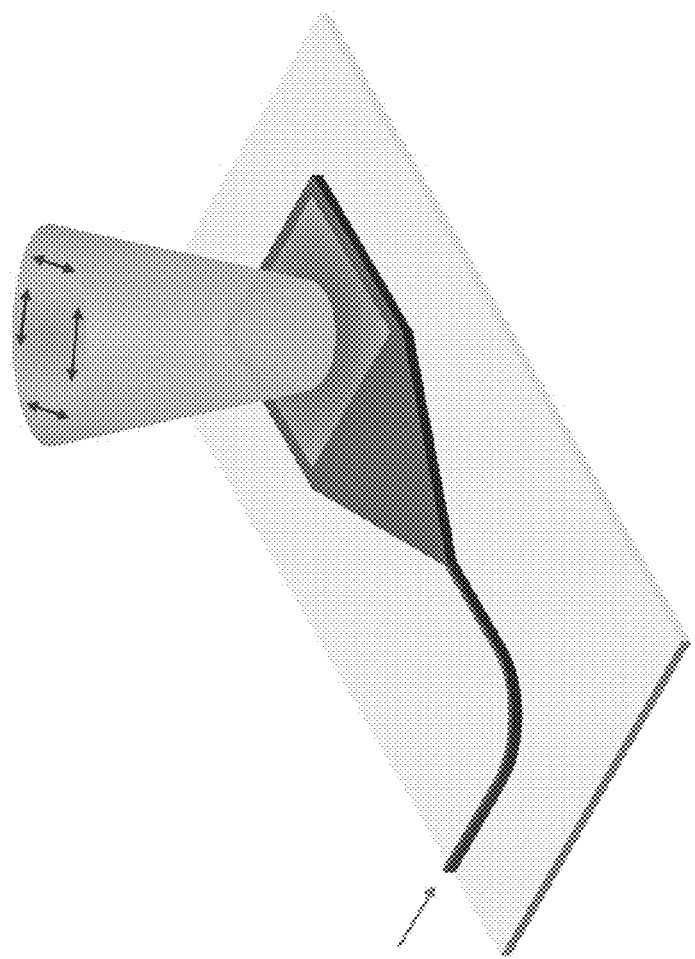

FIGS. 15 and 16 show designs of leaky-wave metasurfaces capable of generating vectorial beams. The device in FIG. 15 can generate a radially polarized vectorial beam and the one on FIG. 16 can generate an azimuthally polarized vectorial beam. In both designs, an input single-mode waveguide is expanded by a taper to match the size of the metasurface. In this way, a flattened slab waveguide mode is created and the interaction between the mode and the metasurface leads to a leaky-wave in the free space, or surface emission from the chip. The waveguide can be composed of a layer of electron beam resist on top of a layer of silicon nitride, and the metasurface is patterned in the electron beam resist layer. The local polarization of the surface emission is controlled by the local angular orientations of the perturbations, and the local amplitude of the surface emission is controlled by the local magnitude of the perturbations.

Figure 17B:
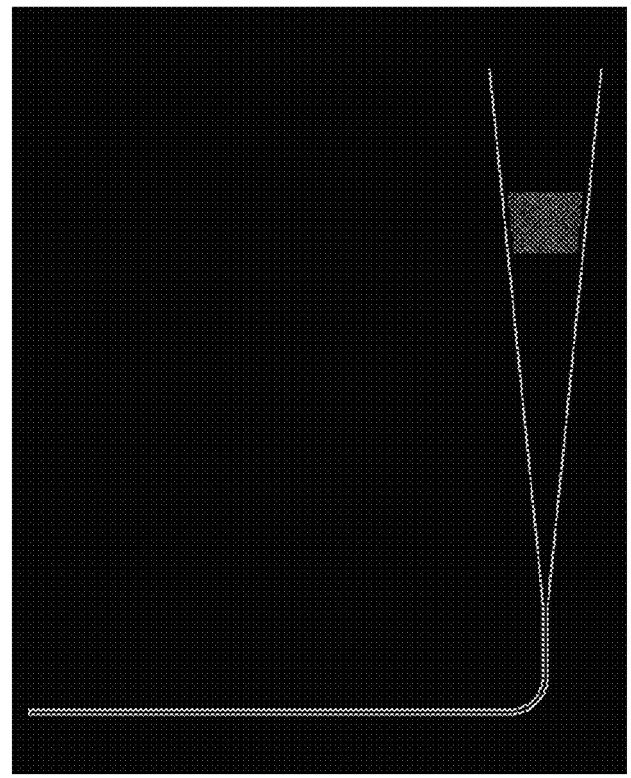
FIGS. 17A-17E provide diagrams showing the design and operation of an integrated resonant metalens converting in-plane guided light into a circularly polarized focusing beam.
Figure 17A:
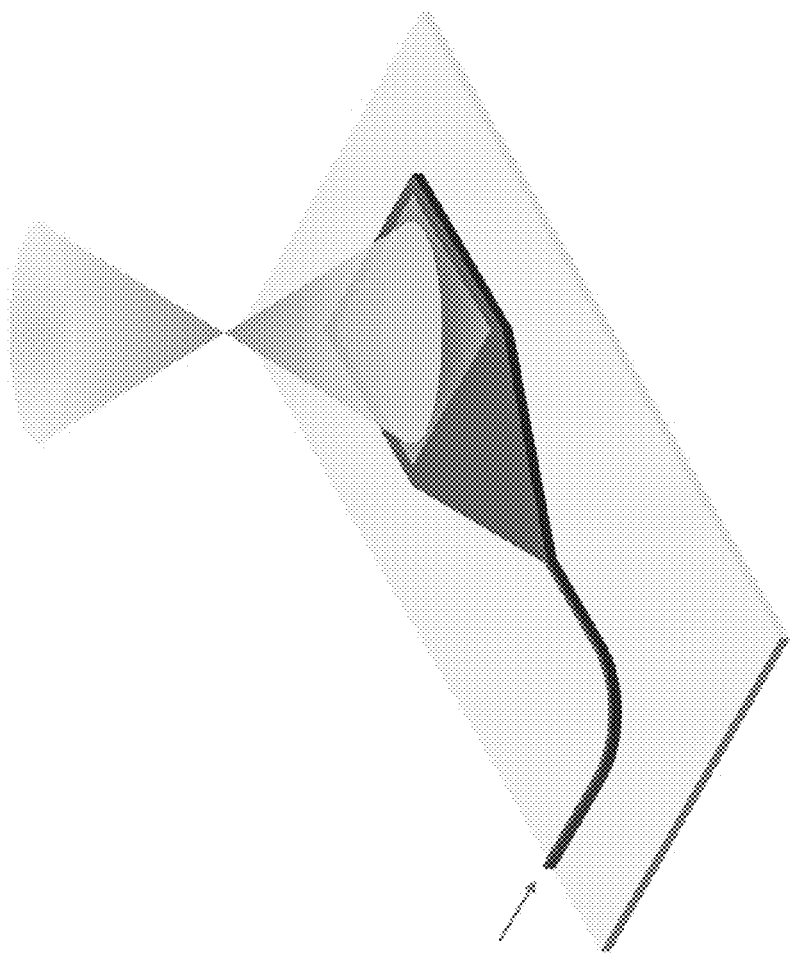
Figure 17E:
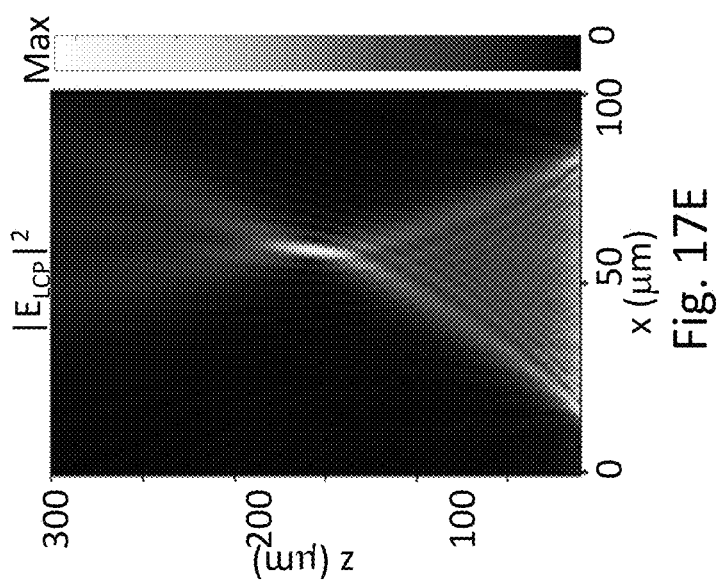
Figure 17C:
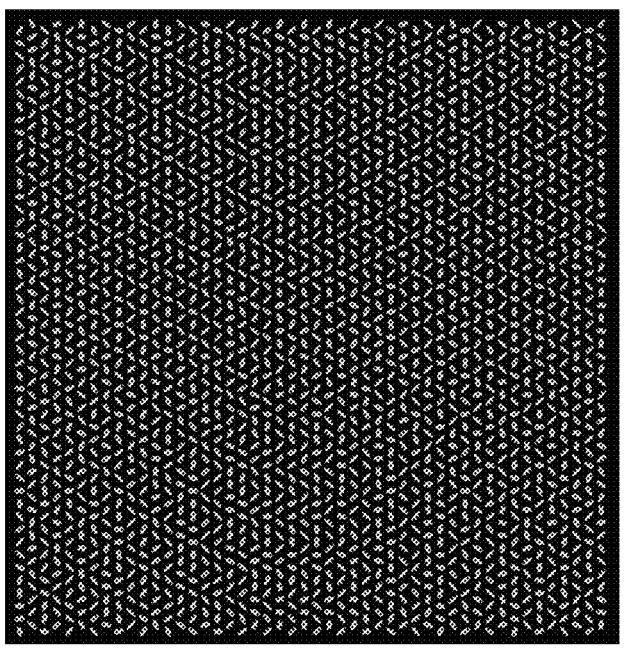
Figure 17D:
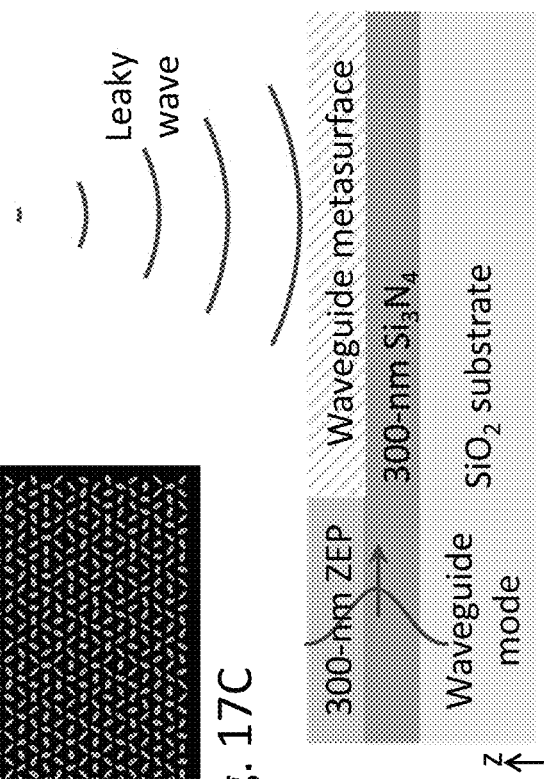

With a polarization filter to select a circularly polarized component of the surface emission, a spatial distribution of polarization states can be converted into a spatial distribution of geometric phase for wavefront shaping. Based on this mechanism, an integrated leaky-wave metalens can be designed. FIG. 17A is a schematic of the device, which converts an input waveguide mode into a convergent spherical wave in the free space. Top view of the layout of the whole device is shown in FIG. 17B. FIG. 17C shows the design of a portion of the metalens near its center and FIG. 17D is a schematic of the vertical cross-section of the device, showing that the metasurface is patterned into the top 300-nm ZEP polymer layer (an electron beam resist) and scatters a guided wave at λ=1.5 μm to form a leaky wave with controlled phase and amplitude profiles. Full-wave simulations confirm that the RCP component of the leaky wave is focused at a designed distance of 150 μm above the metalens (FIG. 17E).

Figure 18:
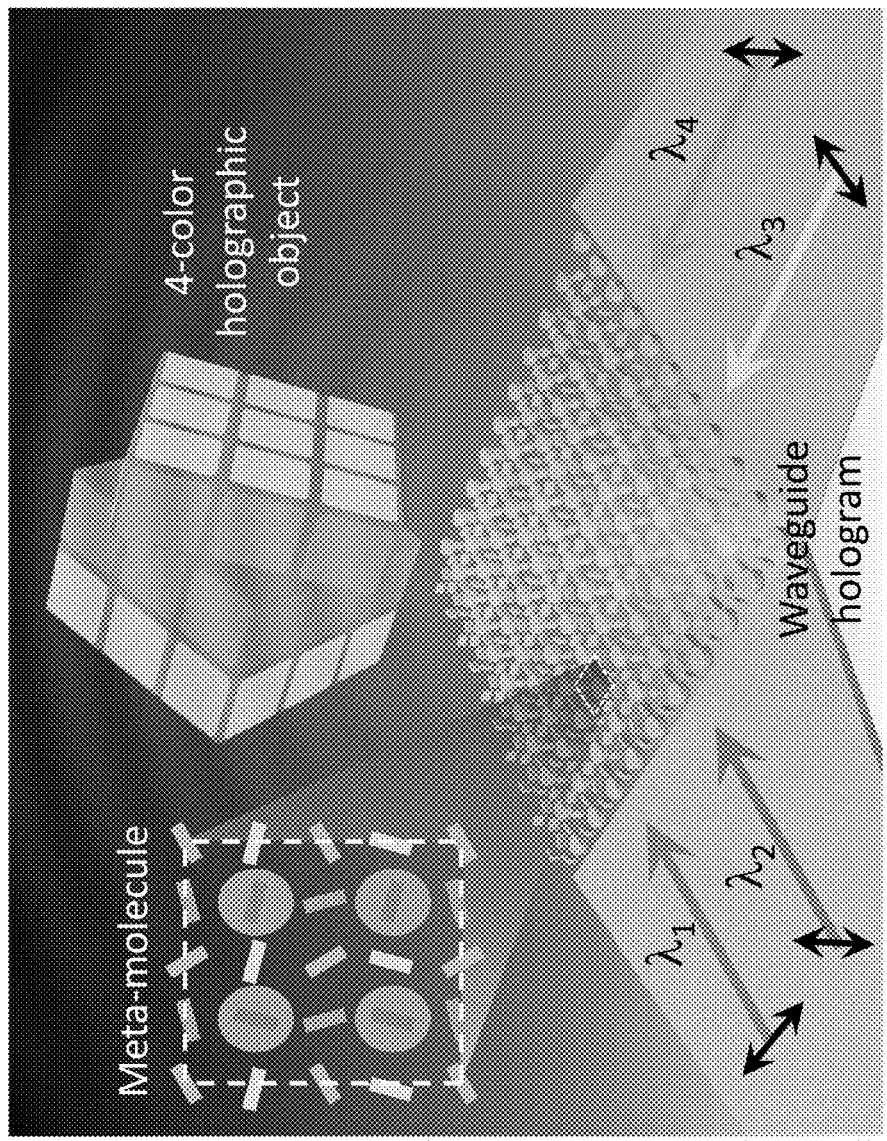
FIG. 18 provides diagrams showing the design and operation of an integrated metasurface display containing four perturbations, which under the excitation of four orthogonal waveguide modes can produce a four-color, phase-amplitude holographic scene.

Multiple orthogonal perturbations can be added onto a single leaky-wave metasurface to realize multifunctionality. FIG. 18 depicts a schematic of a leaky-wave metasurface enabling a four-color, phase-amplitude display. The same set of four quasi-BICs depicted in FIG. 7A is employed and these quasi-BICs are excusively excited by slab waveguide modes with matched frequencies and polarization states. In FIG. 18, incident waveguide modes are represented by single-headed arrows and their polarization states by double-headed arrows. Specifically, two waveguide modes (at wavelengths $\lambda_1$ and $\lambda_2$) are coupled into the device via one port and two other waveguide modes (at wavelengths $\lambda_3$ and $\lambda_4$) are coupled into the device via another port. The modes at $\lambda_1$ and $\lambda_3$ are transverse-electric waveguide modes and the modes at $\lambda_2$ and $\lambda_4$ are transverse-magnetic waveguide modes. This metasurface containing four perturbations and under the excitation of four orthogonal waveguide modes can produce a four-color, phase-amplitude holographic scene.

What is claimed is:
1. A system for modulating light, comprising:
a substrate; and
a plurality of meta units, patterned on the substrate and configured to spatially and spectrally modulate the light, wherein the plurality of meta units includes a spatially distributed perturbation and forms a perturbed photonic crystal lattice supporting a quasi-bound state in the continuum (quasi-BIC); wherein the perturbation is a symmetry-breaking perturbation.
2. The system of claim 1, wherein the substrate is transparent to the light.
3. The system of claim 1, wherein the perturbation is configured to be rotated to introduce a spatially distributed geometric phase.
4. The system of claim 1, wherein the perturbation is a chiral perturbation supporting the quasi-BIC with any arbitrary polarization state.
5. The system of claim 1, wherein the perturbed photonic crystal lattice is configured to form a nonlocal metasurface that modifies the light at a predetermined wavelength range associated with an optical resonance.
6. The system of claim 5, wherein the nonlocal metasurface is configured to simultaneously transmits the light outside of the predetermined wavelength range without distortion.

7. The system of claim 5, wherein the metasurface is configured to modify an amplitude, a phase, and/or a polarization angle of the light at a resonance with an engineered resonant wavelength and a quality factor (Q-factor).

8. The system of claim 5, wherein the metasurface is configured to be a metalens that modifies a wavefront of the light at a resonance with an engineered resonant wavelength, a Q-factor, and/or resonant wavelength dispersion.

9. The system of claim 1, wherein the lattice comprises a plurality of spatially distributed perturbations and supports a plurality of quasi-BICs.

10. The system of claim 9, wherein the perturbed lattice forms a nonlocal metasurface that modifies the light at a plurality of predetermined wavelength ranges associated with a plurality of optical resonances.

11. The system of claim 10, wherein the metasurface simultaneously transmits the light outside of the predetermined wavelength ranges without distortion.

12. The system of claim 10, wherein the metasurface is configured to be a multi-wavelength metalens that is configured to modify an optical wavefront at each of the optical resonances.

13. The system of claim 1, wherein the light is originated from out-of-plane.

14. The system of claim 1, wherein the light is originated from in-plane.

15. The system of claim 1, wherein the meta units comprise a passive dielectric material, wherein the passive dielectric material is selected from the group consisting of silicon, silicon dioxide, titanium dioxide, silicon nitride, and combinations thereof.

16. The system of claim 1, wherein the meta units comprise an actively tunable material, wherein the actively tunable material is selected from the group consisting of an electro-optical material, a thermo-optical material, a phase change material, and combinations thereof, wherein the electro-optical material comprises silicon and/or lithium niobate, wherein the thermo-optical material comprises silicon and/or germanium, wherein the phase change material comprises vanadium dioxide.

17. The system of claim 16, wherein the actively tunable materials is configured to perform dynamic tuning of a resonant wavelength of the quasi-BIC and dynamic modification of the optical wavefront.

18. A compound metasurface, comprising:
a plurality of substrate surfaces; and
a plurality of meta units, patterned on each of the substrate surfaces and configured to spatially and spectrally modulate the light, wherein the plurality of meta units forms a perturbed photonic crystal lattice supporting a quasi-BIC; wherein the perturbation is a symmetry-breaking perturbation.

19. The compound metasurface of claim 18, wherein the metasurface is configured to be a multi-wavelength metalens that modifies the optical wavefront at a plurality of wavelengths.

* * * * *